(12) United States Patent
Gomi et al.

(10) Patent No.: US 9,037,293 B2
(45) Date of Patent: May 19, 2015

(54) ROBOT

(71) Applicant: Seiko Epson Corporation, Tokyo (JP)

(72) Inventors: Akihiro Gomi, Fujimi (JP); Akio Niu, Matsumoto (JP); Masaki Motoyoshi, Shiojiri (JP)

(73) Assignee: Seiko Epson Corporation (JP)

( * ) Notice: Subject to any disclaimer, the term of this patent is extended or adjusted under 35 U.S.C. 154(b) by 84 days.

(21) Appl. No.: 14/015,075

(22) Filed: Aug. 30, 2013

(65) Prior Publication Data

US 2014/0067120 A1     Mar. 6, 2014

(30) Foreign Application Priority Data

Aug. 31, 2012   (JP) .................................. 2012-191449

(51) Int. Cl.
*G06F 19/00*      (2011.01)
*B25J 9/16*      (2006.01)

(52) U.S. Cl.
CPC .............. *B25J 9/1651* (2013.01); *B25J 9/1638* (2013.01); *B25J 9/1694* (2013.01)

(58) Field of Classification Search
CPC .............. A61B 2019/2234; A61B 2019/5248; A61B 5/02427; B25J 9/0006; B25J 9/1694; B25J 13/088; B25J 13/00; B25J 9/06; B25J 9/1635; B25J 17/00; B25J 19/02; B25J 9/0087; B25J 9/009; B25J 9/046
USPC ........ 700/258, 245, 254, 250; 623/24, 57, 58, 623/59, 60, 61, 62
See application file for complete search history.

(56) References Cited

U.S. PATENT DOCUMENTS

| | | | |
|---|---|---|---|
| 6,216,056 B1 * | 4/2001 | Ito et al. .......................... | 700/157 |
| 7,765,023 B2 | 7/2010 | Oaki et al. | |
| 2007/0288124 A1 | 12/2007 | Nagata et al. | |
| 2009/0149993 A1 * | 6/2009 | Neki et al. ...................... | 700/254 |
| 2010/0113980 A1 * | 5/2010 | Herr et al. ...................... | 600/587 |
| 2010/0286823 A1 * | 11/2010 | Neki et al. ...................... | 700/245 |
| 2011/0082566 A1 * | 4/2011 | Herr et al. ........................ | 623/24 |
| 2012/0215356 A1 | 8/2012 | Igarashi et al. | |
| 2012/0215357 A1 | 8/2012 | Igarashi et al. | |
| 2013/0073086 A1 * | 3/2013 | Motoyoshi et al. ........... | 700/258 |
| 2014/0067118 A1 * | 3/2014 | Gomi et al. .................... | 700/253 |

FOREIGN PATENT DOCUMENTS

| | | |
|---|---|---|
| JP | 10-100085 | 4/1998 |
| JP | 2005-242794 A | 9/2005 |
| JP | 2011-042022 A | 3/2011 |
| JP | 2012-171051 A | 9/2012 |
| JP | 2012-171052 A | 9/2012 |
| WO | WO-2006-022201 A1 | 3/2006 |

\* cited by examiner

*Primary Examiner* — Ronnie Mancho
(74) *Attorney, Agent, or Firm* — Harness, Dickey & Pierce, P.L.C.

(57) ABSTRACT

A robot includes a base, first and second arms, first and second drive sources, first and second inertia sensors, and first and second angle sensors. A rotation axis of the first arm and a rotation axis of the second arm are orthogonal to each other. The first inertia sensor is installed at the first arm, and the second inertia sensor is installed at the second arm. The first angle sensor is installed at the first drive source, and the second angle sensor is installed at the second drive source. Angular velocities obtained from the first inertia sensor and the first angle sensor are fed back to a first drive source control unit. Angular velocities obtained from the second inertia sensor and the second angle sensor are fed back to a second drive source control unit.

14 Claims, 14 Drawing Sheets

ROBOT

BACKGROUND

1. Technical Field

The present invention relates to a robot.

2. Related Art

A multi-axis robot that includes a base and a plurality of rotatable arms and that works freely in a three-dimensional space has a problem in that vibration is easily generated in the arms due to the rotation of the arms or the disturbance applied to the arms. For the purpose of attenuating the problems of vibration, a known robot includes a vibration suppressing control technique using acceleration sensors that are provided on an arm closest to the tip side and detect acceleration in the directions of three axes including the X-axis, the Y-axis, and the Z-axis (for example, refer to JP-A-10-100085). Another known multi-axis robot includes a base and a plurality of arms and has the rotation axes of the arms parallel to each other and provides angular velocity sensors on the arms, respectively, and is controlled by calculations that also include the components detected using the angular velocity sensors (for example, refer to JP-A-2005-242794).

However, the robots described in JP-A-10-100085 and JP-A-2005-242794 have the following drawbacks.

In the robot of JP-A-10-100085, the acceleration sensor is installed at the tip portion of the arm link portion closest to the tip side. Thus, the acceleration detected by the acceleration sensor is converted and corrected into those for the respective joint portions. At this time, since it is necessary to perform a coordinate axis transformation referred to as the Jacobi's transformation, and a matrix calculation having a number of sine and cosine factors is required, the amount of calculations becomes huge. Since it is necessary to calculate the factors according to the rotation angles of the motors of the respective joint portions that change every moment, it is always necessary to execute huge calculations. Accordingly, there is a drawback in that the response speed becomes slow.

Additionally, since accurate acceleration or speed cannot be fed back if calculation precision declines, vibration suppression capability may decline or control performance may be impaired. For this reason, there is a restriction on the design of a control system such that a high-speed computing unit is required, for example.

Additionally, in the calculation of the coordinate axis transformation, there is a region (incalculable region) with no coordinate axis transformation solution referred to as a singular point. In this region, the vibration suppression capability may decline or vibration may be increased instead.

In the robot of JP-A-2005-242794, since the rotation axes of the arms are parallel to each other and the directions of the components detected by the angular velocity sensors are the same, a calculation and control method in which different rotational components are mixed are not taken into consideration. Accordingly, even if this technique is adopted for a multi-axis robot in which the rotation axes of the arms are different from each other, vibration suppression capability cannot be satisfied.

SUMMARY

An advantage of some aspects of the disclosure is to provide a multi-axis robot that can easily and reliably suppress vibration in a robot that includes a plurality of arms and has the rotation axes of the arms different from each other.

Application Example 1

This application example is directed to a robot including a base; a first arm that is coupled to the base and rotates with a first rotation axis as an axial center; a second arm that is coupled to the first arm and rotates with a second rotation axis in a direction orthogonal to the first rotation axis as an axial center; a first drive source that rotates the first arm through a first angular velocity command; a first inertia sensor that is installed at the first arm and detects the angular velocity or acceleration of the first rotation axis of the first arm; a first angle sensor that detects the rotation angle of the first drive source; a second drive source that rotates the second arm through a second angular velocity command; a second inertia sensor that is installed at the second arm and detects the angular velocity or acceleration of the second rotation axis of the second arm; a second angle sensor that detects the rotation angle of the second drive source; a first drive source control unit that feeds back a first correction component, which is derived from an angular velocity $\omega A1$ of the first rotation axis of the first arm obtained from the first inertia sensor and an angular velocity $\omega A1m$ of the first rotation axis of the first arm obtained from the first angle sensor, and controls the first drive source; and a second drive source control unit that feeds back a second correction component, which is derived from an angular velocity $\omega A2$ of the second rotation axis of the second arm obtained from the second inertia sensor, and an angular velocity $\omega A2m$ of the second rotation axis of the second arm obtained from the second angle sensor, and controls the second drive source.

With this configuration, the vibration in the robot can be easily and reliably suppressed.

That is, a huge calculation is unnecessary, and thereby, the response speed in the control of the robot can be increased. Additionally, since a calculation in which a singular point is present is unnecessary, the control of the robot can be reliably performed, and vibration can be reliably suppressed.

Additionally, since the inertia sensors are installed at the first arm and the second arm, respectively, and the rotation axis for the rotation of the first arm and the rotation axis for the rotation of the second arm are made orthogonal to each other, the angular velocities of the respective arms can be detected as simple rotational components in which these velocities are not mixed. Hence, since control is performed by the calculation using these velocities, the vibration in the robot can be more easily, accurately, and reliably suppressed.

Application Example 2

In the robot of the application example, it is preferable that the robot further includes the first drive source control unit that feeds back the first angular velocity command by the first correction component obtained by multiplying a value, which is obtained by subtracting the angular velocity $\omega A1m$ from the angular velocity $\omega A1$, by a feedback gain; and the second drive source control unit that feeds back the second angular velocity command by the second correction component obtained by multiplying a value, which is obtained by subtracting the angular velocity $\omega A2m$ from the angular velocity $\omega A2$, by a feedback gain.

With this configuration, the vibration in the robot can be more reliably suppressed. In addition, since the rotation axis for the rotation of the first arm and the rotation axis for the rotation of the second arm are made orthogonal to each other, the angular velocities of the respective arms can be detected as simple rotational components in which these velocities are not mixed. Since the rotational components with no mixture of these velocities are multiplied by feedback gains, respectively, the respective rotational components can be corrected with high precision. Hence, since control is performed by the calculation using these velocities, the vibration in the robot can be more easily, accurately, and reliably suppressed.

Application Example 3

This application example is directed to a robot including a base; a first arm that is coupled to the base and rotates with a first rotation axis as an axial center; a second arm that is coupled to the first arm and rotates with a second rotation axis in a direction orthogonal to the first rotation axis as an axial center; a third arm that rotates with a third rotation axis in a direction parallel to the second rotation axis as an axial center; a first drive source that rotates the first arm through a first angular velocity command; a first inertia sensor that is installed at the first arm and detects the angular velocity or acceleration of the first rotation axis of the first arm; a first angle sensor that detects the rotation angle of the first drive source; a second drive source that rotates the second arm through a second angular velocity command; a second inertia sensor that is installed at the second arm and detects the angular velocity or acceleration of the second rotation axis of the second arm; a second angle sensor that detects the rotation angle of the second drive source; a third drive source that rotates the third arm through a third angular velocity command; a third inertia sensor that is installed at the third arm and detects the angular velocity or acceleration of the second rotation axis of the third arm; a third angle sensor that detects the rotation angle of the third drive source; a first drive source control unit that feeds back a first correction component, which is derived from an angular velocity $\omega A1$ of the first rotation axis of the first arm obtained from the first inertia sensor and an angular velocity $\omega A1m$ of the first rotation axis of the first arm obtained from the first angle sensor, and controls the first drive source; a second drive source control unit that feeds back a second correction component, which is derived from an angular velocity $\omega A2$ of the second rotation axis of the second arm obtained from the second inertia sensor, an angular velocity $\omega A2m$ of the second rotation axis of the second arm obtained from the second angle sensor, and controls the second drive source; and a third drive source control unit that feeds back a third correction component, which is derived from the angular velocity $\omega A2$, an angular velocity $\omega A3$ of the second rotation axis of the third arm obtained from the third inertia sensor, and an angular velocity $\omega A3m$ of the third rotation axis of the third arm obtained from the third angle sensor, and controls the third drive source.

With this configuration, the vibration in the robot can be easily and reliably suppressed.

That is, a huge calculation is unnecessary, and thereby, the response speed in the control of the robot can be increased. Additionally, since a calculation in which a singular point is present is unnecessary, the control of the robot can be reliably performed, and vibration can be reliably suppressed.

Additionally, since the inertia sensors are installed at the respective arms and the control of suppressing the vibration is performed on the respective arms, the vibration in the robot can be more reliably suppressed.

Additionally, since the inertia sensors are installed at the first arm, the second arm, and the third arm, respectively, and the rotation axis for the rotation of the first arm and the rotation axis for the rotation of the second arm are made orthogonal to each other, and the rotation axis for the rotation of the second arm and the rotational axis for the rotation of the third arm are made parallel to each other, the angular velocities of the respective arms can be detected as simple rotational components in which these velocities are not mixed. Hence, since control is performed by the calculation using these velocities, the vibration in the robot can be more easily, accurately, and reliably suppressed.

Application Example 4

In the robot of the application example, it is preferable that the robot further includes the first drive source control unit that feeds back the first angular velocity command by the first correction component obtained by multiplying a value, which is obtained by subtracting the angular velocity $\omega A1m$ from the angular velocity $\omega A1$, by a feedback gain; the second drive source control unit that feeds back the second angular velocity command by the second correction component obtained by multiplying a value, which is obtained by subtracting the angular velocity $\omega A2m$ from the angular velocity $\omega A2$, by a feedback gain; and the third drive source control unit that feeds back the third angular velocity command by the third correction component obtained by multiplying a value, which is obtained by subtracting the angular velocity $\omega A2$ and the angular velocity $\omega A3m$ from the angular velocity $\omega A3$, by a feedback gain.

With this configuration, the vibration in the robot can be more reliably suppressed. In addition, since the rotation axis for the rotation of the first arm and the rotation axis for the rotation of the second arm are made orthogonal to each other and the rotation axis for the rotation of the second arm and the rotational axis for the rotation of the third arm are made parallel to each other, the angular velocities of the respective arms can be detected as simple rotational components in which these velocities are not mixed. Since the rotational components with no mixture of these velocities are multiplied by feedback gains, respectively, the respective rotational components can be corrected with high precision. Hence, since control is performed by the calculation using these velocities, the vibration in the robot can be more easily, accurately, and reliably suppressed.

Application Example 5

This application example is directed to a robot including a base; a first arm that is coupled to the base and rotates with a first rotation axis as an axial center; a second arm that is coupled to the first arm and rotates with a second rotation axis in a direction orthogonal to the first rotation axis as an axial center; a third arm that rotates with a third rotation axis in a direction parallel to the second rotation axis as an axial center; a first drive source that rotates the first arm through a first angular velocity command; a first inertia sensor that is installed at the first arm and detects the angular velocity or acceleration of the first rotation axis of the first arm; a first angle sensor that detects the rotation angle of the first drive source; a second drive source that rotates the second arm through a second angular velocity command; a second inertia sensor that is installed at the second arm and detects the angular velocity or acceleration of the second rotation axis of the second arm; a second angle sensor that detects the rotation angle of the second drive source; a third drive source that rotates the third arm through a third angular velocity command; a third inertia sensor that is installed at the third arm and detects the angular velocity or acceleration of the second rotation axis of the third arm; a third angle sensor that detects the rotation angle of the third drive source; a first drive source control unit that feeds back a first correction component, which is derived from an angular velocity $\omega A1$ of the first rotation axis of the first arm obtained from the first inertia sensor and an angular velocity $\omega A1m$ of the first rotation axis of the first arm obtained from the first angle sensor, and controls the first drive source; a second drive source control unit that feeds back a second correction component, which is derived from an angular velocity ωA3 of the second rotation axis of the third arm obtained from the third inertia sensor, an angular velocity ωA2m of the second rotation axis of the second arm obtained from the second angle sensor, and an angular velocity ωA3m of the third rotation axis of the third arm obtained from the third angle sensor, and controls the second drive source; and a third drive source control unit that feeds back a third correction component, which is derived from an angular velocity ωA2 of the second rotation axis of the second arm obtained from the second inertia sensor, the angular velocity ωA3, and the angular velocity ωA3m, and controls the third drive source.

With this configuration, the vibration in the robot can be easily and reliably suppressed.

That is, a huge calculation is unnecessary, and thereby, the response speed in the control of the robot can be increased. Additionally, since a calculation in which a singular point is present is unnecessary, the control of the robot can be reliably performed, and vibration can be reliably suppressed.

Additionally, since the inertia sensors are installed at the respective arms and the control of suppressing the vibration is performed on the respective arms, the vibration in the robot can be more reliably suppressed.

Particularly, since the second drive source control unit performs the control of suppressing vibration on the second drive source that controls the operation of the second drive source, that is, rotates the second arm by the angular velocities ωA3, ωA2m, and ωA3m, using the detection result of the third inertia sensor installed at the third arm where a larger vibration than the second arm is generated, the effect of suppressing the vibration can be enhanced.

Application Example 6

In the robot of the application example, it is preferable that the robot further includes the first drive source control unit that feeds back the first angular velocity command by the first correction component obtained by multiplying a value, which is obtained by subtracting the angular velocity ωA1m from the angular velocity ωA1, by a feedback gain; the second drive source control unit that feeds back the second angular velocity command by the second correction component obtained by multiplying a value, which is obtained by subtracting the angular velocity ωA2m and the angular velocity ωA3m from the angular velocity ωA3, by a feedback gain; and the third drive source control unit that feeds back the third angular velocity command by the third correction component obtained by multiplying a value, which is obtained by subtracting the angular velocity ωA2 and the angular velocity ωA3m from the angular velocity ωA3, by a feedback gain.

Accordingly, the vibration in the robot can be more reliably suppressed. In addition, since the rotation axis for the rotation of the first arm and the rotation axis for the rotation of the second arm are made orthogonal to each other and the rotation axis for the rotation of the second arm and the rotational axis for the rotation of the third arm are made parallel to each other, the angular velocities of the respective arms can be detected as simple rotational components in which these velocities are not mixed. Since the rotational components with no mixture of these velocities are multiplied by feedback gains, respectively, the respective rotational components can be corrected with high precision. Hence, since control is performed by the calculation using these velocities, the vibration in the robot can be more easily, accurately, and reliably suppressed. Particularly, in the second drive source control unit, a value including a component detected by the third inertia sensor is multiplied by a feedback gain. Thus, the effect of suppressing vibration can be further enhanced.

Application Example 7

This application example is directed to a robot including a base; a first arm that is coupled to the base and rotates with a first rotation axis as an axial center; a second arm that is coupled to the first arm and rotates with a second rotation axis in a direction orthogonal to the first rotation axis as an axial center; a third arm that rotates with a third rotation axis in a direction parallel to the second rotation axis as an axial center; a first drive source that rotates the first arm through a first angular velocity command; a first inertia sensor that is installed at the first arm and detects the angular velocity or acceleration of the first rotation axis of the first arm; a first angle sensor that detects the rotation angle of the first drive source; a second drive source that rotates the second arm through a second angular velocity command; a second inertia sensor that is installed at the second arm and detects the angular velocity or acceleration of the second rotation axis of the second arm; a second angle sensor that detects the rotation angle of the second drive source; a third drive source that rotates the third arm through a third angular velocity command; a third inertia sensor that is installed at the third arm and detects the angular velocity or acceleration of the second rotation axis of the third arm; a third angle sensor that detects the rotation angle of the third drive source; an angle detection unit that detects that the arm angle formed between an axis of the second arm and an axis of the third arm; a first drive source control unit that feeds back a first correction component, which is derived from an angular velocity ωA1 of the first rotation axis of the first arm obtained from the first inertia sensor and an angular velocity ωA1m of the first rotation axis of the first arm obtained from the first angle sensor, and controls the first drive source; a second drive source control unit that feeds back either a value which is derived from an angular velocity ωA3 of the second rotation axis of the third arm obtained from the third inertia sensor, an angular velocity ωA2m of the second rotation axis of the second arm obtained from the second angle sensor, and an angular velocity ωA3m of the third rotation axis of the third arm obtained from the third angle sensor, or a value which is derived from an angular velocity ωA2 of the second rotation axis of the second arm obtained from the second inertia sensor, and the angular velocity ωA2m, as a second correction component according to the arm angle, and controls the second drive source; and a third drive source control unit that feeds back a third correction component, which is derived from the angular velocity ωA2, the angular velocity ωA3, and the angular velocity ωA3m, and controls the third drive source.

With this configuration, the vibration in the robot can be easily and reliably suppressed.

That is, a huge calculation is unnecessary, and thereby, the response speed in the control of the robot can be increased. Additionally, since a calculation in which a singular point is present is unnecessary, the control of the robot can be reliably performed, and vibration can be reliably suppressed.

Additionally, since the inertia sensors are installed at the respective arms and the control of suppressing the vibration is performed on the respective arms, the vibration in the robot can be more reliably suppressed.

Particularly, since the second drive source control unit selects and feeds back either a value derived from the angular velocity ωA3, the angular velocity ωA2m, and the angular velocity ωA3m or a value derived from the angular velocity ωA2 and the angular velocity ωA2m on the basis of the detection results of the angle detection unit, the compatibility between the effect of suppressing vibration and the stability of control can be achieved.

Application Example 8

In the robot of the application example, it is preferable that the robot further includes the first drive source control unit that feeds back the first angular velocity command by the first correction component obtained by multiplying a value, which is obtained by subtracting the angular velocity ωA1m from the angular velocity ωA1, by a feedback gain; the second drive source control unit that feeds back the second angular velocity command, using either a value obtained by multiplying a value, which is obtained by subtracting the angular velocity ωA2m and the angular velocity ωA3m from the angular velocity ωA3, by a feedback gain, or a value obtained by multiplying a value, which is obtained by subtracting the angular velocity ωA2m from the angular velocity ωA2, by a feedback gain, as the second correction component; and the third drive source control unit that feeds back the third angular velocity command by the third correction component obtained by multiplying a value, which is obtained by subtracting the angular velocity ωA2 and the angular velocity ωA3m from the angular velocity ωA3, by a feedback gain.

With this configuration, the vibration in the robot can be more reliably suppressed.

Application Example 9

In the robot of the application example, it is preferable that the robot further includes the second drive source control unit that feeds back the second angular velocity command by the second correction component obtained by multiplying a value, which is obtained by subtracting the angular velocity ωA2m and the angular velocity ωA3m from the angular velocity ωA3, by a feedback gain when the arm angle is equal to or larger than a first threshold and is equal to or smaller than a second threshold that is larger than the first threshold and that feeds back the second angular velocity command by the second correction component obtained by multiplying a value, which is obtained by subtracting the angular velocity ωA2m from the angular velocity ωA2, by a feedback gain when the arm angle is smaller than the first threshold or larger than the second threshold.

Accordingly, the compatibility between enhancing the effect of suppressing vibration and the stability of control can be more reliably achieved.

That is, when the angle θ formed between the axis of the second arm and the axis of the third arm is equal to or larger than the first threshold and equal to or smaller than the second threshold (extended posture), the control of the robot is stable but the inertia moment of the robot is large and the vibration in the robot is large, compared to a case (folded posture) where the angle θ formed between the axis of the second arm and the axis of the third arm is smaller than the first threshold or larger than the second threshold. Thus, the effect of suppressing vibration can be enhanced by feeding back the second angular velocity command by the second correction component obtained by multiplying a value, which is obtained by subtracting the angular velocity ωA2m and the angular velocity ωA3m from the angular velocity ωA3, by a feedback gain.

That is, when the angle θ formed between the axis of the second arm and the axis of the third arm is smaller than the first threshold or larger than the second threshold, the inertia moment of the robot is small and the vibration in the robot is small but control tends to become unstable and the robot vibrates easily, compared to a case where the angle θ formed between the axis of the second arm and the axis of the third arm is equal to or larger than the first threshold and equal to or smaller than the second threshold. Thus, the vibration in the robot can be prevented and control can be stabilized, by feeding back the second angular velocity command by the second correction component obtained by multiplying a value, which is obtained by subtracting the angular velocity ωA2m from the angular velocity ωA2, by a feedback gain.

Application Example 10

In the robot of the application example, it is preferable that the first threshold is set within a range of 45° to 135°, and the second threshold is set within a range of 225° to 315°.

With this configuration, the compatibility between enhancing the effect of suppressing vibration and the stability of control can be more reliably achieved.

Application Example 11

In the robot of the application example, it is preferable that the first inertia sensor is installed at a tip portion in the rotation of the first arm, and the second inertia sensor is installed at a tip portion in the rotation of the second arm.

With this configuration, since the first inertia sensor detects the angular velocity or acceleration of the first arm in a region where the vibration in the first arm is at the maximum and the second inertia sensor detects the angular velocity or acceleration of the second arm in a region where the vibration in the second arm is at the maximum, the vibration in the robot can be more reliably suppressed.

Application Example 12

In the robot of the application examples, it is preferable that the first inertia sensor is installed at a tip portion in the rotation of the first arm, the second inertia sensor is installed at a tip portion in the rotation of the second arm, and the third inertia sensor is installed at a tip portion in the rotation of the third arm.

With this configuration, since the first inertia sensor detects the angular velocity or acceleration of the first arm in a region where the vibration in the first arm is at the maximum, the second inertia sensor detects the angular velocity or acceleration of the second arm in a region where the vibration in the second arm is at the maximum, and the third inertia sensor detects the angular velocity or acceleration of the third arm in a region where the vibration in the third arm is at the maximum, the vibration in the robot can be more reliably suppressed.

Application Example 13

In the robot of the application example, it is preferable that the first rotation axis coincides with the normal line of an installation surface of the base.

With this configuration, the robot can be easily controlled.

Application Example 14

This application example is directed to a robot including a base; a first arm that is coupled to the base and rotates with a first rotation axis as an axial center; a second arm that rotates with a second rotation axis orthogonal to the first rotation axis as an axial center; a first inertia sensor that detects the angular velocity of the first arm; a first angle sensor that detects the rotation angle of a drive source of the first arm; a second inertia sensor that detects the angular velocity of the second arm; a second angle sensor that detects the rotation angle of a drive source of the second arm; a control unit of the drive source of the first arm that feeds back an angular velocity derived from a detection result of the first angle sensor and an angular velocity detected from the first inertia sensor; and a control unit of the drive source of the second arm that feeds back an angular velocity derived from a detection result of the second angle sensor and an angular velocity detected from the second inertia sensor.

With this configuration, it is possible to provide a multi-joint robot that can freely work in a three-dimensional space but easily and reliably suppresses vibration caused by driving.

In the robot of the application example, since the arms are coupled so that the rotation axes orthogonal to each other or the rotation axes parallel to each other are mixed, information from one inertia sensor may be only information on at least one coordinate axis. Accordingly, for example, coordinate axis transformation, such as the Jacobi's transformation, is unnecessary, and feedback to the controller can be performed using a simple calculation.

That is, a calculation for performing feedback to the controller on the basis of huge information is unnecessary, and thereby, the response speed in the control of the robot can be increased. Additionally, since a calculation in which a singular point is present is unnecessary, the control of the robot can be reliably performed, and vibration can be reliably suppressed. In addition, although the control unit of the drive source of the first arm and the control unit of the drive source of the second arm are built on mutually independent calculation circuits, the control units can be built on the same IC circuit.

Application Example 15

This application example is directed to a robot including a plurality of orthogonal rotation axes, one inertia sensor and one angle sensor are provided so as to correspond to each of the orthogonal rotation axes, and angular velocities obtained from the angle sensor and the inertia sensor are feedback-controlled for every rotation axis corresponding to the angle sensor and the inertia sensor.

With this configuration, it is possible to provide a multi-joint robot that can freely work in a three-dimensional space but easily and reliably suppresses vibration caused by driving.

Since the robot of the application example includes a plurality of orthogonal rotation axes, one inertia sensor and one angle sensor are provided so as to correspond to each of the orthogonal rotation axes, and angular velocities obtained from the angle sensor and the inertia sensor are feedback-controlled for every rotation axis corresponding to the angle sensor and the inertia sensor, information from the inertia sensor may be only information on at least one coordinate axis. Accordingly, for example, coordinate axis transformation, such as the Jacobi's transformation, is unnecessary, and feedback to the controller can be performed using a simple calculation.

That is, a calculation for performing feedback to the controller on the basis of huge information is unnecessary, and thereby, the response speed in the control of the robot can be increased. Additionally, since a calculation in which a singular point is present is unnecessary, the control of the robot can be reliably performed, and vibration can be reliably suppressed. In addition, when one inertia sensor and one angle sensor may be provided so as to correspond to every orthogonal rotation axis, and a plurality of parallel rotation axes are present, one rotation axis of them may be selected from a rotation axis orthogonal to the one rotation axis, and one inertia sensor and one angle sensor may be provided for these rotation axes, respectively.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

A robot will be described below in detail on the basis of preferred embodiments shown in the accompanying drawings.

First Embodiment

Figure 1:
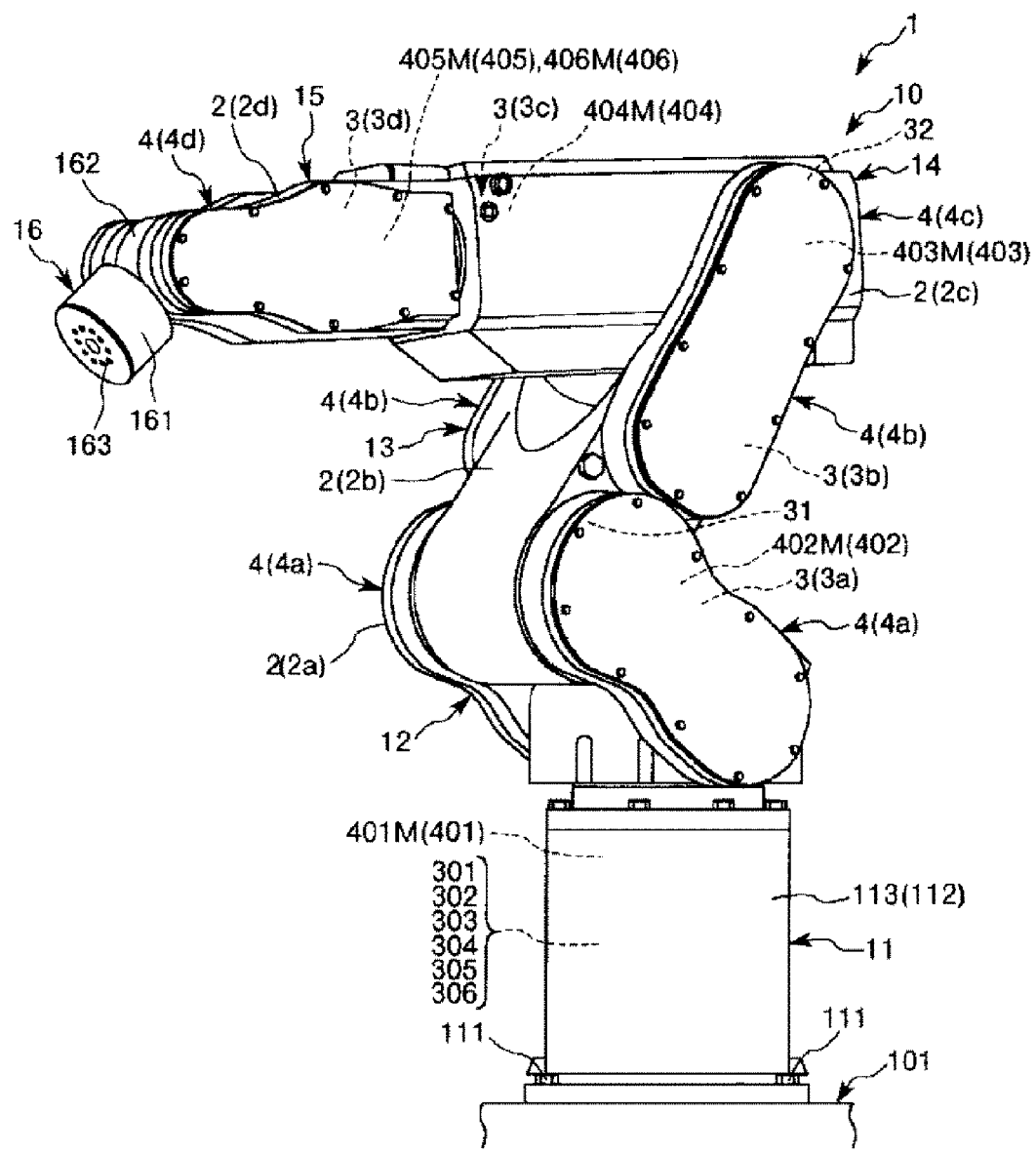
FIG. 1 is the perspective view when a first embodiment of a robot is viewed from the front side.
Figure 2:
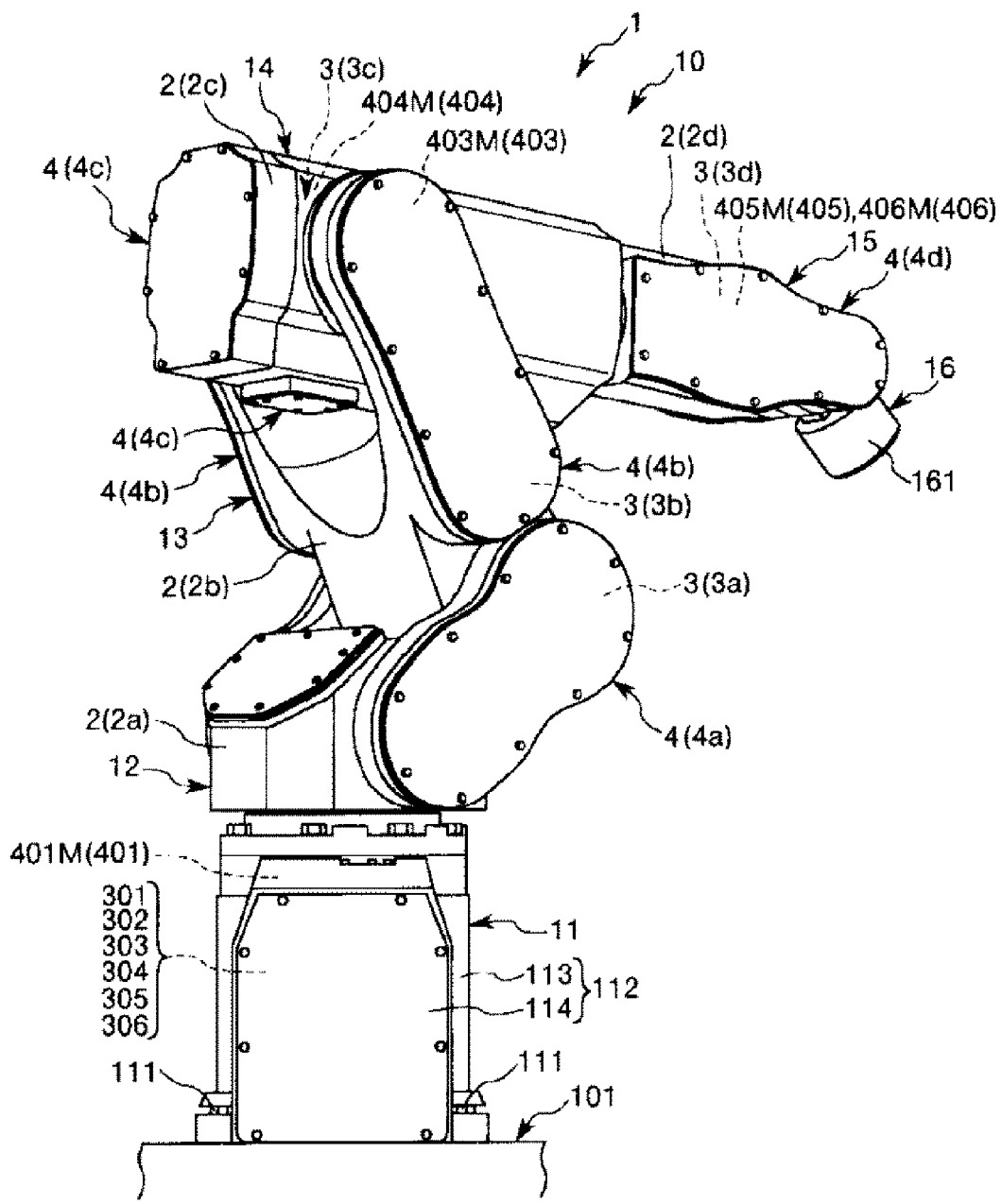
FIG. 2 is a perspective view when the robot shown in FIG. 1 is viewed from the back side.
Figure 3:
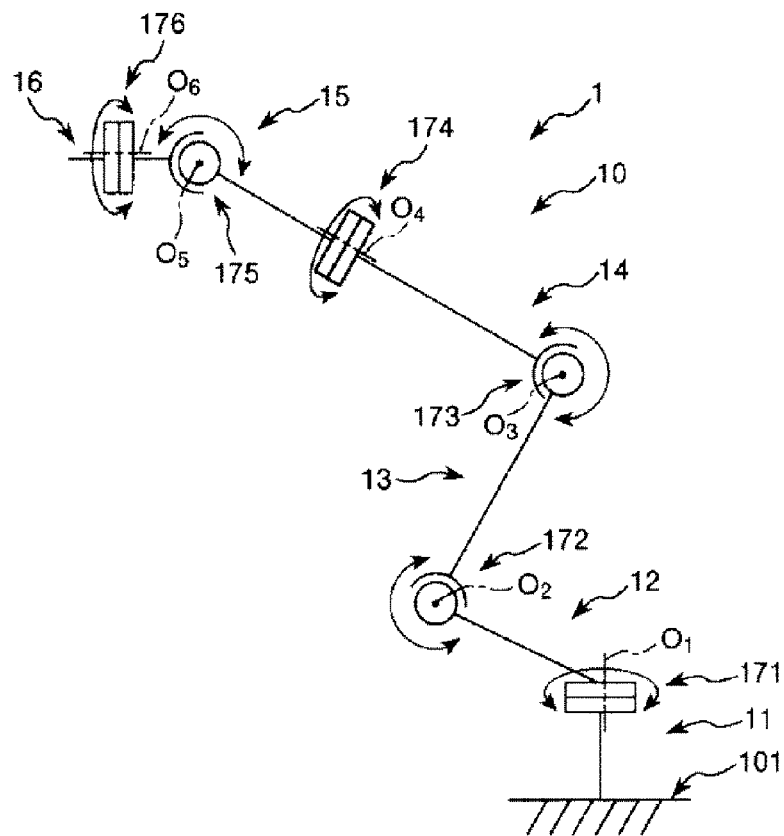
FIG. 3 is a schematic view of the robot shown in FIG. 1.
Figure 4:
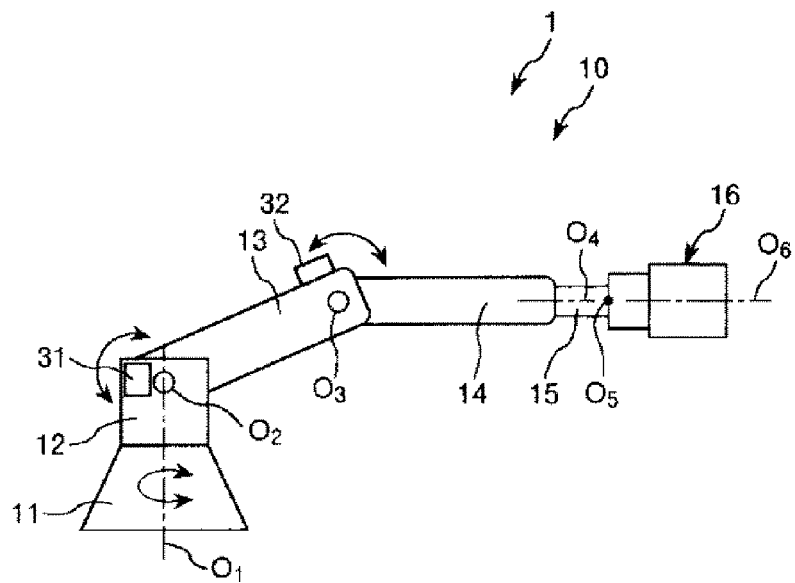
FIG. 4 is a schematic view of the robot shown in FIG. 1.
Figure 5:
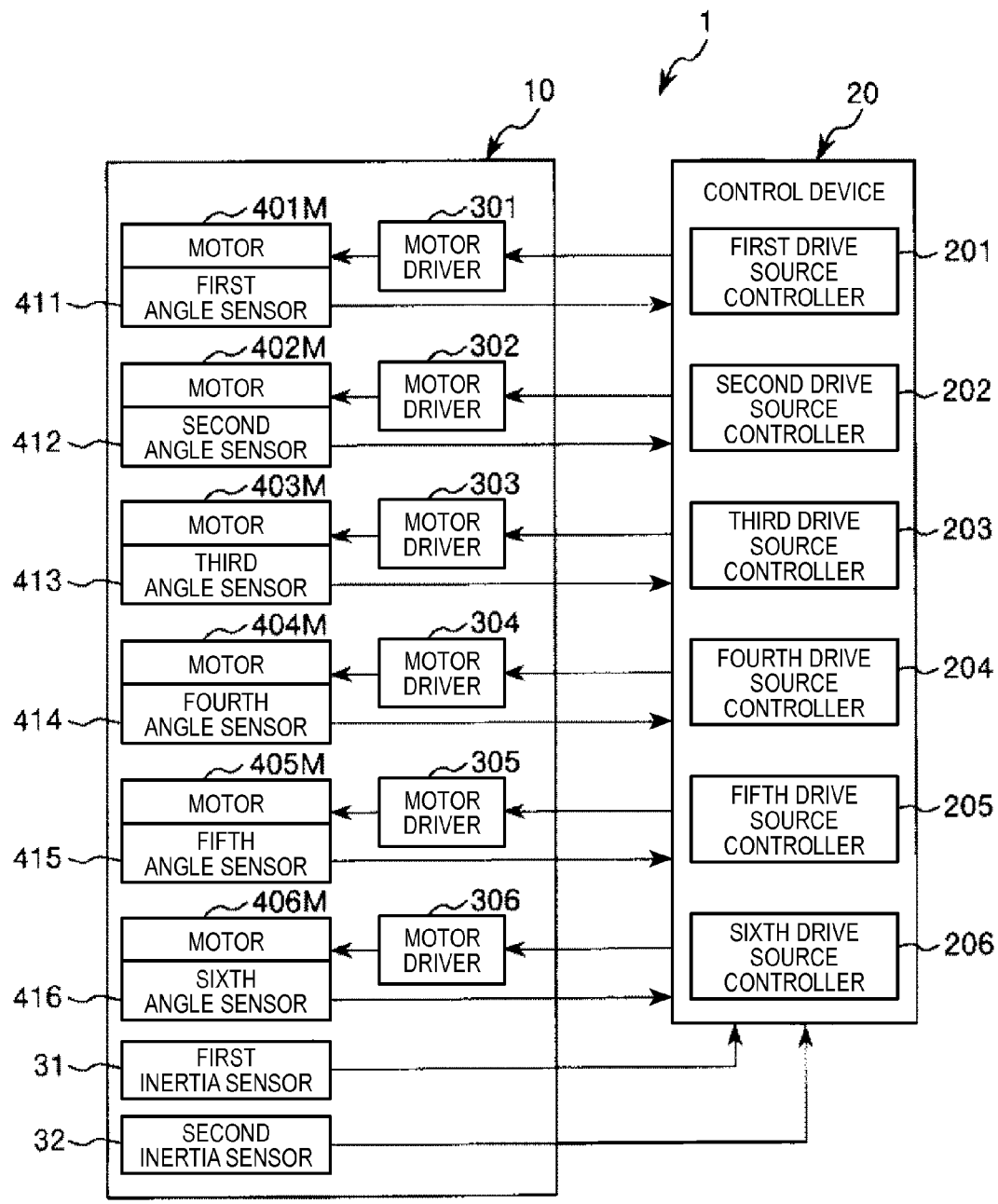
FIG. 5 is a block diagram of portions of the robot shown in FIG. 1.

FIG. 1 is the perspective view when a first embodiment of a robot is viewed from the front side. FIG. 2 is a perspective view when the robot shown in FIG. 1 is viewed from the back side. FIGS. 3 and 4 are schematic views of the robot shown in FIG. 1, respectively. FIG. 5 is a block diagram of portions of the robot shown in FIG. 1, and FIGS. 6 to 11 are block diagrams of portions of the robot shown in FIG. 1, respectively.

In addition, in the following, for convenience of description, the upper side in FIGS. 1 to 4 is referred to as "upper" or "upside" and the lower side is referred to as "lower" or "downside". Additionally, the base side in FIGS. 1 to 4 is referred to as a "base end", and the opposite side is referred to as a "tip". Additionally, the rotation axes O2 and O3 are shown in an exaggerated manner in FIG. 4, respectively. Additionally, inertia sensors 31 and 32 are shown outside arms 12 and 13 in FIG. 4, respectively, in order to clarify the presence of the sensors.

A robot (industrial robot) 1 shown in FIGS. 1 to 4 can be used for, for example, a manufacturing process that manufactures precision mechanical equipment, such as a wrist watch, and has a robot body 10 and a control device (control unit) 20 (refer to FIG. 5) that controls the operation of the robot body 10. The robot body 10 and the control device 20 are electrically connected. Additionally, the control device 20 can be constituted by, for example, a personal computer (PC) in which a central processing unit (CPU) is built. In addition, the control device 20 is described below in more detail.

The robot body 10 includes a base 11, four arms (links) 12, 13, 14, and 15, a wrist (link) 16, and six drive sources 401, 402, 403, 404, 405, and 406. The robot body 10 is a vertical multi-joint (six-axis) robot (robot body) in which the base 11, the arms 12, 13, 14, and 15, and the wrist 16 are coupled together in the order from a base end side toward a tip side. In the vertical multi-joint robot, the base 11, the arms 12 to 15, and the wrist 16 can also be collectively referred to as "arms", and the arm 12, the arm 13, the arm 14, the arm 15, and the wrist 16 can be referred to as a "first arm", a "second arm", a "third arm", a "fourth arm", and a "fifth or sixth arm", respectively. In addition, the wrist 16 may have the fifth arm and the sixth arm. An end effector or the like can be attached to the wrist 16.

As shown in FIGS. 3 and 4, the arms 12 to 15 and the wrist 16 are supported so as to be independently displaceable with respect to the base 11. The lengths of the arms 12 to 15 and the wrist 16 are not particularly limited, respectively. However, in the illustrated configuration, the lengths of the arms 12 to 14 are set to be larger than those of the other arm 15 and the wrist 16. In addition, for example, the length of the third arm 14 may be made smaller than the lengths of the first arm 12 and the second arm 13.

The base 11 and the first arm 12 are coupled together via a joint 171. The first arm 12 has a first rotation axis O1 parallel to the vertical direction as a rotation center, and is rotatable with respect to the base 11 around the first rotation axis O1. The first rotation axis O1 coincides with the normal line of an upper surface of a floor 101 that is an installation surface of the base 11. The rotation around the first rotation axis O1 is performed by the driving of the first drive source 401. Additionally, the first drive source 401 is driven by a motor 401M and a cable (not shown), and the motor 401M is controlled by the control device 20 via a motor driver 301 that is electrically connected thereto (refer to FIG. 5). The driving from the motor 401M may be transmitted to the first drive source 401 by a speed reducer (not shown) provided together with the motor 401M, and the speed reducer may be omitted.

The first arm 12 and the second arm 13 are coupled together via a joint 172. The second arm 13 is rotatable with respect to the first arm 12 with the second rotation axis O2 parallel to the horizontal direction as an axial center. The second rotation axis O2 is orthogonal to the first rotation axis O1. The rotation around the second rotation axis O2 is performed by the driving of the second drive source 402. Additionally, the second drive source 402 is driven by a motor 402M and a cable (not shown), and the motor 402M is controlled by the control device 20 via a motor driver 302 that is electrically connected thereto (refer to FIG. 5). The driving from the motor 402M may be transmitted to the second drive source 402 by a speed reducer (not shown) provided in addition to the motor 402M, and the speed reducer may be omitted.

The second arm 13 and the third arm 14 are coupled together via a joint 173. The third arm 14 has a rotation axis O3 parallel to the horizontal direction as a rotation center, and is rotatable with respect to the second arm 13 around the third rotation axis O3. The third rotation axis O3 is parallel to the second rotation axis O2. The rotation around the third rotation axis O3 is performed by the driving of the third drive source 403. Additionally, the third drive source 403 is driven by a motor 403M and a cable (not shown), and the motor 403M is controlled by the control device 20 via a motor driver 303 that is electrically connected thereto (refer to FIG. 5). The driving from the motor 403M may be transmitted to the third drive source 403 by a speed reducer (not shown) provided in addition to the motor 403M, and the speed reducer may be omitted.

The third arm 14 and the fourth arm 15 are coupled together via a joint 174. The fourth arm 15 has a fourth rotation axis O4 parallel to the direction of a central axis of the third arm 14 as a rotation center, and is rotatable with respect to the third arm 14 (base 11) around the fourth rotation axis O4. The fourth rotation axis O4 is orthogonal to the third rotation axis O3. The rotation around the fourth rotation axis O4 is performed by the driving of the fourth drive source 404. Additionally, the fourth drive source 404 is driven by a motor 404M and a cable (not shown), and the motor 404M is controlled by the control device 20 via a motor driver 304 that is electrically connected thereto (refer to FIG. 5). The driving from the motor 404M may be transmitted to the fourth drive source 404 by a speed reducer (not shown) provided together with the motor 404M, and the speed reducer may be omitted. In addition, the fourth rotation axis O4 may be parallel to an axis orthogonal to the third rotation axis O3.

The fourth arm 15 and the wrist 16 are coupled together via a joint 175. The wrist 16 has a fifth rotation axis O5 parallel to the horizontal direction (y-axis direction) as a rotation center, and is rotatable with respect to the fourth arm 15 around the fifth rotation axis O5. The fifth rotation axis O5 is orthogonal to the fourth rotation axis O4. The rotation around the fifth rotation axis O5 is performed by the driving of the fifth drive source 405. Additionally, the fifth drive source 405 is driven by a motor 405M and a cable (not shown), and the motor 405M is controlled by the control device 20 via a motor driver 305 that is electrically connected thereto (refer to FIG. 5). The driving from the motor 405M may be transmitted to the fifth drive source 405 by a speed reducer (not shown) provided together with the motor 405M, and the speed reducer may be omitted. Additionally, the wrist 16 has a sixth rotation axis O6 vertical to the fifth rotation axis O5 as a rotation center, and is also rotatable via a joint 176 around the sixth rotation axis O6. The rotation axis O6 is orthogonal to the rotation axis O5. The rotation around the sixth rotation axis O6 is performed by the driving of the sixth drive source 406. Additionally, the sixth drive source 406 is driven by a motor 406M and a cable (not shown), and the motor 406M is controlled by the control device 20 via a motor driver 306 that is electrically connected thereto (refer to FIG. 5). The driving from the motor 406M may be transmitted to the sixth drive source 406 by a speed reducer (not shown) provided in addition to the motor 406M, and the speed reducer may be omitted. In addition, the fifth rotation axis O5 may be parallel to an axis orthogonal to the fourth rotation axis O4, and the sixth rotation axis O6 may be parallel to an axis orthogonal to the fifth rotation axis O5.

Additionally, the first inertia sensor 31 is installed at the first arm 12. The first inertia sensor 31 detects the angular velocity of the first arm 12 around the first rotation axis O1.

Although the installation position of the first inertia sensor 31 at the first arm 12 is not particularly limited, a tip portion of the first arm 12 is preferable. In the present embodiment, the first inertia sensor 31 is installed at the tip portion inside the first arm 12. Since the vibration in the first arm 12 becomes the maximum at the tip portion of the first arm, this can more reliably suppress the vibration in the robot 1. In addition, it should be understood that the first inertia sensor 31 may be installed at a base end portion of the first arm 12.

Additionally, a second inertia sensor 32 is installed at the second arm 13. The second inertia sensor 32 detects the angular velocity of the second arm 13 around the second rotation axis O2. Although the installation position of the second inertia sensor 32 at the second arm 13 is not particularly limited, a tip portion of the second arm 13 is preferable. In the present embodiment, the second inertia sensor 32 is installed at the tip portion inside the second arm 13. Since the vibration in the second arm 13 becomes the maximum at the tip portion of the second arm, this can more reliably suppress the vibration in the robot 1. In addition, it should be understood that the second inertia sensor 32 may be installed at a base end portion of the second arm 13.

Additionally, the first inertia sensor 31 and the second inertia sensor 32 are not particularly limited, respectively, and in the present embodiment, for example, a gyroscope sensor, an acceleration sensor, or the like can be used.

Here, in the robot 1, in order to suppress the vibration in the first arm 12 and the second arm 13, the first inertia sensor 31 and the second inertia sensor 32 are installed at both the first arm 12 and the second arm 13 as mentioned above, and the operation of the drive sources 401 and 402 is controlled on the basis of detection results of the first inertia sensor 31 and the second inertia sensor 32. Accordingly, the vibration in the first arm 12 and the second arm 13 can be reliably suppressed, and thereby, the vibration in the entire robot 1 can be reliably suppressed.

A first angle sensor 411, a second angle sensor 412, a third angle sensor 413, a fourth angle sensor 414, a fifth angle sensor 415, and a sixth angle sensor 416 are provided at respective motors or speed reducers in the drive sources 401 to 406. Encoders, rotary encoders, or the like can be used as the angle sensors. The angle sensors 411 to 416 detect the rotation angles of rotating shafts of the motors or speed reducers of the drive sources 401 to 406, respectively. The motors of the drive sources 401 to 406 are not particularly limited, respectively. For example, it is preferable to use servo motors, such as AC servo motors or DC servo motors. Additionally, the respective cables may be inserted through the robot body 10, respectively.

As shown in FIG. 5, the robot body 10 is electrically connected to the control device 20. That is, the drive sources 401 to 406, the angle sensors 411 to 416, and the inertia sensors 31 and 32 are electrically connected to the control device 20, respectively.

The control device 20 can independently operate the arms 12 to 15 and the wrist 16, respectively, that is, can independently control the drive sources 401 to 406 via the motor drivers 301 to 306, respectively. In the case, the control device 20 performs detection by the angle sensors 411 to 416, the first inertia sensor 31, and the second inertia sensor 32, and controls the driving, for example, angular velocity, rotation angle, or the like of the drive sources 401 to 406 on the basis of the detection results, respectively. A control program is stored in advance in a recording medium built in the control device 20.

As shown in FIG. 1 and FIG. 2, when the robot 1 is a vertical multi-joint robot, the base 11 is a portion that is located on the lowermost side of the vertical multi-joint robot and is fixed to the floor 101 of an installation space. The fixing method is not particularly limited, and for example, in the present embodiment shown in FIGS. 1 and 2, a fixing method using a plurality of bolts 111 is used. In addition, a fixing place in the installation space of the base 11 can also be the wall or ceiling of the installation space other than the floor.

The base 11 has a hollow base body (housing) 112. The base body 112 can be separated into a cylindrical portion 113 that forms a cylindrical shape, and a box-shaped portion 114 that is integrally formed at an outer peripheral portion of the cylindrical portion 113 and forms a box shape. For example, the motor 401M and the motor drivers 301 to 306 are stored in such a base body 112.

The arms 12 to 15 have a hollow arm body 2, a drive mechanism 3, and a sealing unit 4, respectively. In addition, in the following, for convenience of description, the arm body 2, the drive mechanism 3, and the sealing unit 4 of the first arm 12 may be referred to as an "arm body 2a", a "drive mechanism 3a", and a "sealing unit 4a", respectively, the arm body 2, the drive mechanism 3, and the sealing unit 4 of the second arm 13 may be referred to as an "arm body 2b", a "drive mechanism 3b", and a "sealing unit 4b", respectively, the arm body 2, the drive mechanism 3, and the sealing unit 4 of the third arm 14 may be referred to as an "arm body 2c", a "drive mechanism 3c", and a "sealing unit 4c", respectively, and the arm body 2, the drive mechanism 3, and the sealing unit 4 of the fourth arm 15 may be referred to as an "arm body 2d", a "drive mechanism 3d", and a "sealing unit 4d", respectively.

Additionally, the joints 171 to 176 have rotation support mechanisms (not shown), respectively. The rotation support mechanisms are a mechanism that supports one of two arms coupled to each other so as to be rotatable to the other, a mechanism that supports one of the base 11 and the first arm 12 coupled to each other so as to be rotatable to the other, and a mechanism that supports one of the fourth arm 15 and the wrist 16 coupled to each other so as to be rotatable to the other. When the fourth arm 15 and the wrist 16 that are coupled to each other are taken as an example, the rotation support mechanism can rotate the wrist 16 with respect to the fourth arm 15. Additionally, each rotation support mechanism has a speed reducer (not shown) that reduces the rotating speed of a corresponding motor in a predetermined reduction ratio, and transmits the driving force thereof to a corresponding arm, the wrist body 161 of the wrist 16, and a support ring 162.

The first arm 12 is coupled to an upper end portion (tip portion) of the base 11 in a posture in which the first arm 12 inclines with respect to the horizontal direction. In the first arm 12, the drive mechanism 3a has the motor 402M, and is stored within the arm body 2a. Additionally, the inside of the arm body 2a is hermetically sealed by the sealing unit 4a.

The second arm 13 is coupled to a tip portion of the first arm 12. In the second arm 13, the drive mechanism 3b has the motor 403M, and is stored within the arm body 2b. Additionally, the inside of the arm body 2b is hermetically sealed by the sealing unit 4b.

The third arm 14 is coupled to a tip portion of the second arm 13. In the third arm 14, the drive mechanism 3c has the motor 404M, and is stored within the arm body 2c. Additionally, the inside of the arm body 2c is hermetically sealed by the sealing unit 4c.

The fourth arm 15 is coupled to a tip portion of the third arm 14 in parallel with the direction of a central axis thereof. In the arm 15, the drive mechanism 3d has the motors 405M and 406M, and is stored within the arm body 2d. Additionally, the inside of the arm body 2d is hermetically sealed by the sealing unit 4d.

The wrist 16 is coupled to a tip portion (end portion opposite the base 11) of the fourth arm 15. For example, a manipulator (not shown) that grips precision mechanical equipment, such as a wrist watch, is detachably mounted on a tip portion (an end portion opposite the fourth arm 15) of the wrist 16. In addition, the manipulator is not particularly limited, and includes, for example, a manipulator of a configuration having a plurality of fingers. The robot 1 can convey the precision mechanical equipment by controlling the operation of the arms 12 to 15, the wrist 16, or the like with the precision mechanical equipment gripped by the manipulator.

The wrist 16 has the wrist body (sixth arm) 161 that forms a cylindrical shape, and the support ring (fifth arm) 162 that is configured separately from the wrist body 161, is provided at a base end portion of the wrist body 161, and forms a ring shape.

A tip face 163 of the wrist body 161 is a flat surface, and serves as a mounting surface on which the manipulator is mounted. Additionally, the wrist body 161 is coupled to the drive mechanism 3d of the fourth arm 15 via the joint 176, and is rotated around the rotation axis O6 by the driving of the motor 406M of the drive mechanism 3d.

The support ring 162 is coupled to the drive mechanism 3d of the fourth arm 15 via the joint 175, and is rotated around the rotation axis O5 of the entire wrist body 161 by the driving of the motor 405M of the drive mechanism 3d.

Next, the configuration of the control device 20 will be described with reference to FIGS. 5 and 6 to 11.

As shown in FIGS. 5 and 6 to 11, the control device 20 has a first drive source controller (first drive source control unit) (first angular velocity command) 201 that controls the operation of the first drive source 401, a second drive source controller (second drive source control unit) (second angular velocity command) 202 that controls the operation of the second drive source 402, a third drive source controller (third drive source control unit) (third angular velocity command) 203 that controls the operation of the third drive source 403, a fourth drive source controller (fourth drive source control unit) (fourth angular velocity command) 204 that controls the operation of the fourth drive source 404, a fifth drive source controller (fifth drive source control unit) (fifth angular velocity command) 205 that controls the operation of the fifth drive source 405, and a sixth drive source controller (sixth drive source control unit) (sixth angular velocity command) 206 that controls the operation of the sixth drive source 406.

Figure 6:
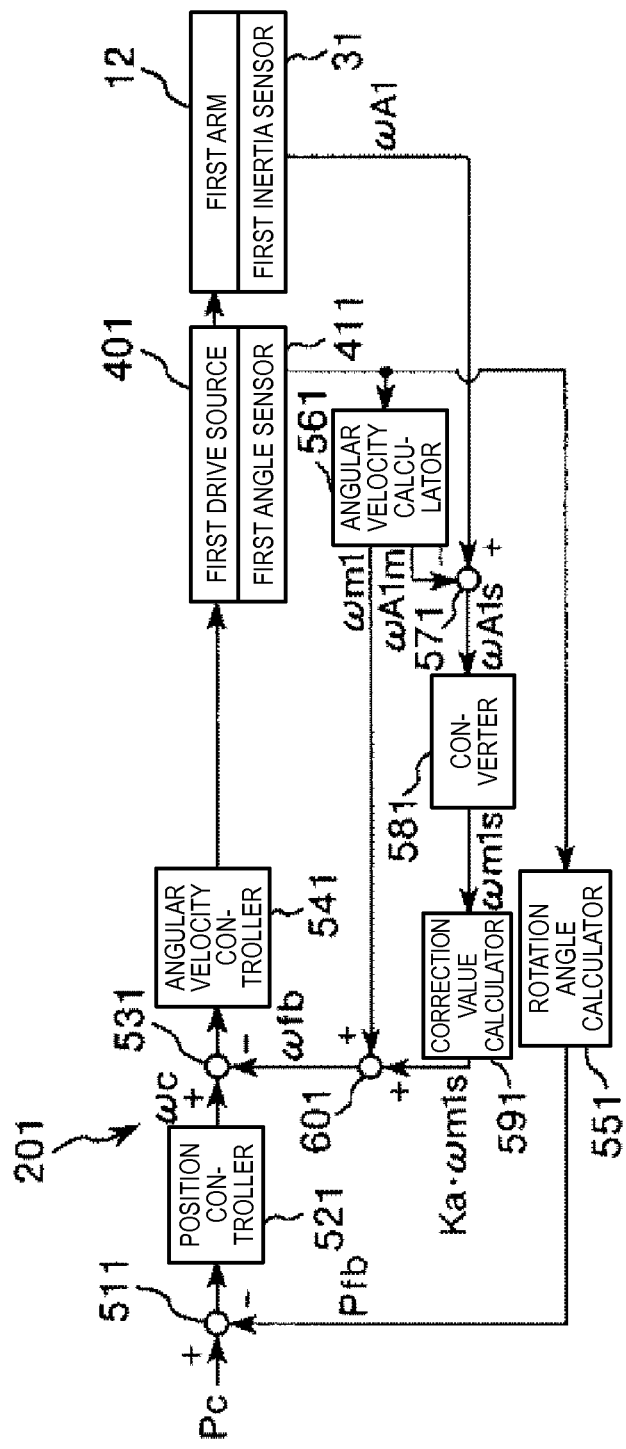
FIG. 6 is a block diagram of portions of the robot shown in FIG. 1.

As shown in FIG. 6, the first drive source controller 201 has a subtractor 511, a position controller 521, a subtractor 531, an angular velocity controller 541, a rotation angle calculator 551, an angular velocity calculator 561, a subtractor 571, a converter 581, a correction value calculator 591, and an adder 601.

Figure 7:
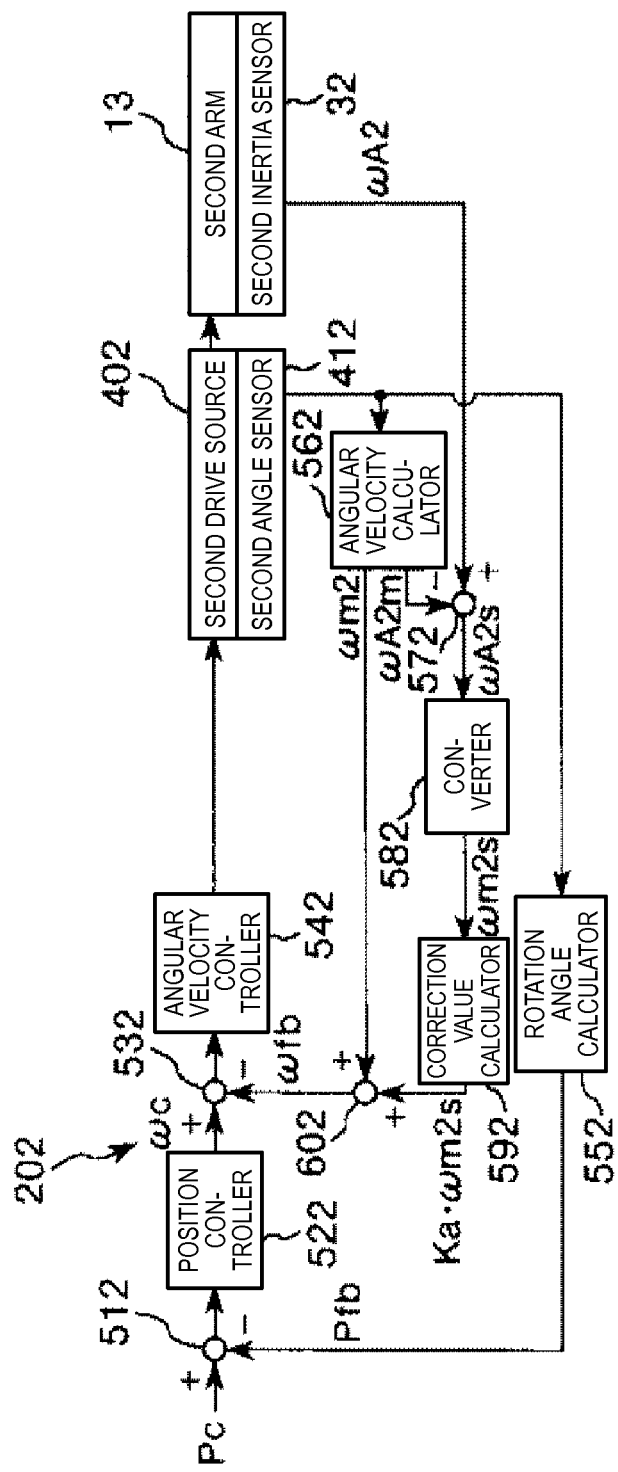
FIG. 7 is a block diagram of portions of the robot shown in FIG. 1.

As shown in FIG. 7, the second drive source controller 202 has a subtractor 512, a position controller 522, a subtractor 532, an angular velocity controller 542, a rotation angle calculator 552, an angular velocity calculator 562, a subtractor 572, a converter 582, a correction value calculator 592, and an adder 602.

Figure 8:
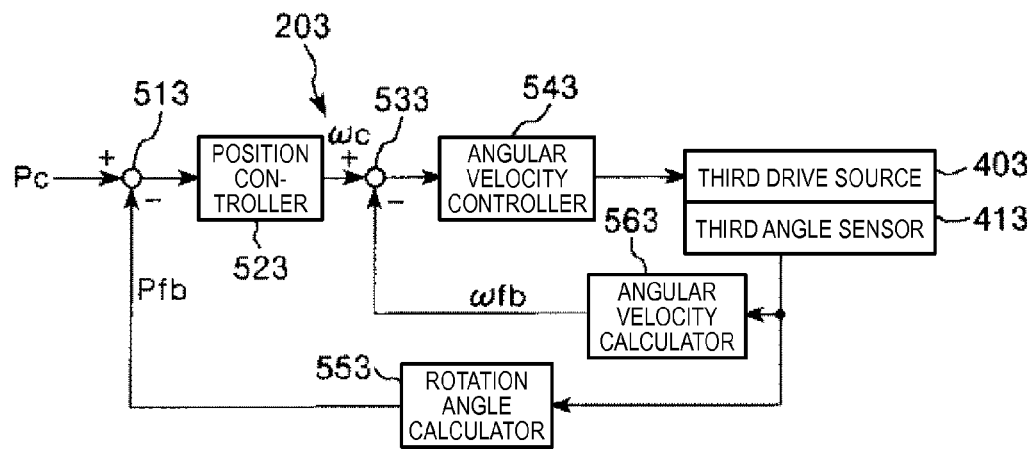
FIG. 8 is a block diagram of portions of the robot shown in FIG. 1.

As shown in FIG. 8, the third drive source controller 203 has a subtractor 513, a position controller 523, a subtractor 533, an angular velocity controller 543, a rotation angle calculator 553, and an angular velocity calculator 563.

Figure 9:
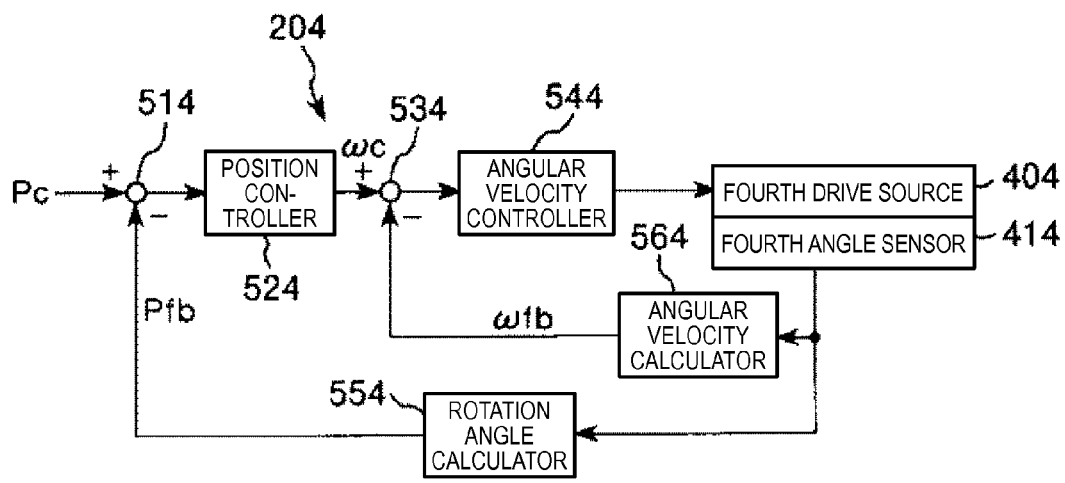
FIG. 9 is a block diagram of portions of the robot shown in FIG. 1.

As shown in FIG. 9, the fourth drive source controller 204 has a subtractor 514, a position controller 524, a subtractor 534, an angular velocity controller 544, a rotation angle calculator 554, and an angular velocity calculator 564.

Figure 10:
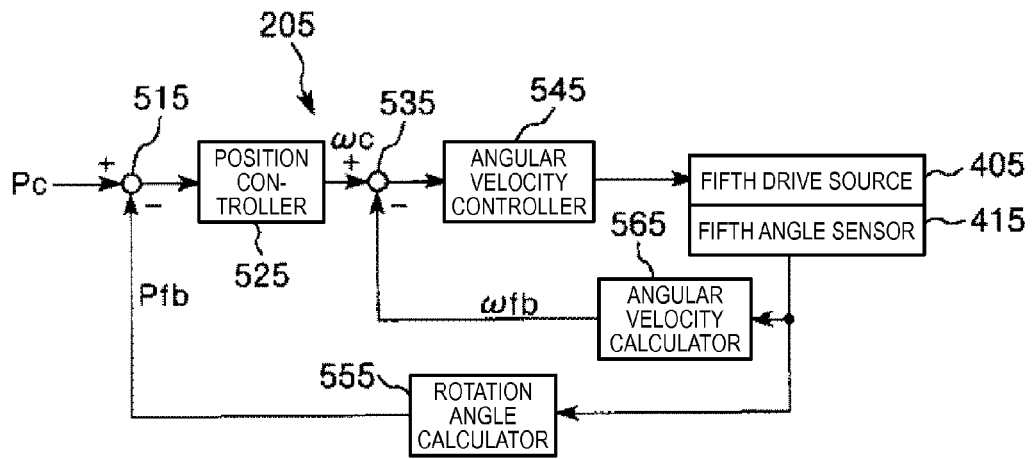
FIG. 10 is a block diagram of portions of the robot shown in FIG. 1.

As shown in FIG. 10, the fifth drive source controller 205 has a subtractor 515, a position controller 525, a subtractor 535, an angular velocity controller 545, a rotation angle calculator 555, and an angular velocity calculator 565.

Figure 11:
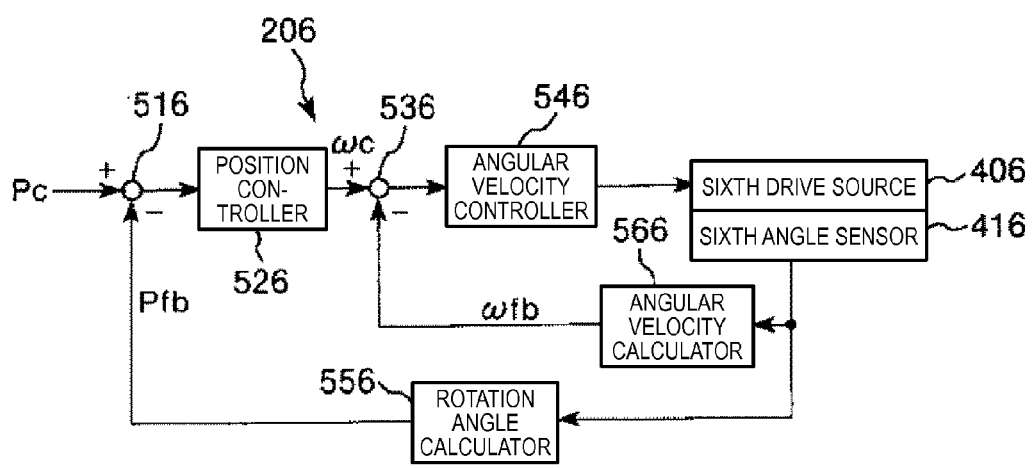
FIG. 11 is a block diagram of portions of the robot shown in FIG. 1.

As shown in FIG. 11, the sixth drive source controller 206 has a subtractor 516, a position controller 526, a subtractor 536, an angular velocity controller 546, a rotation angle calculator 556, and an angular velocity calculator 566.

Here, the control device 20 calculates a target position of the wrist 16 on the basis of the contents of processing to be performed by the robot 1, and generates a track for moving the wrist 16 to the target position. The control device 20 measures the rotation angles of the respective drive sources 401 to 406 for every predetermined control cycle so that the wrist 16 moves along the generated track, and outputs values calculated on the basis of the measurement results to the drive source controllers 201 to 206 as position commands Pc of the respective drive sources 401 to 406, respectively (refer to FIGS. 6 to 11). In addition, although "values are input and output" or the like are written in the above and the following, this means "signals corresponding to the values are input and output".

As shown in FIG. 6, in addition to a position command Pc of the first drive source 401, detection signals are input from the first angle sensor 411 and the first inertia sensor 31, respectively, to the first drive source controller 201. The first drive source controller 201 drives the first drive source 401 by feedback control using the respective detection signals so that a rotation angle (position feedback value Pfb) of the first drive source calculated from the detection signal of the first angle sensor 411 becomes the position command Pc and an angular velocity feedback value δfb to be described below becomes an angular velocity command ωc to be described below.

That is, the position command Pc is input to the subtractor 511 of the first drive source controller 201, and the position feedback value Pfb to be described below is input from the rotation angle calculator 551. In the rotation angle calculator 551, the number of pulses input from the first angle sensor 411 is counted, and the rotation angle of the first drive source 401 according to the counted value is output to the subtractor 511 as the position feedback value Pfb. The subtractor 511 outputs a deviation (value obtained by subtracting the position feedback value Pfb from a targeted value of the rotation angle of the first drive source 401) between the position command Pc and the position feedback value Pfb to the position controller 521.

The position controller 521 performs predetermined calculation processing using the deviation input from the subtractor 511 and a proportional gain that is a predetermined factor, and calculates the targeted value of the angular velocity of the first drive source 401 according to the deviation. The position controller 521 outputs a signal showing the targeted value (command value) of the angular velocity of the first drive source 401 to the subtractor 531 as the angular velocity command (first angular velocity command) ωc. In addition, in the present embodiment, a proportional control (P control) is performed as the feedback control. However, the feedback control is not limited to this.

The angular velocity command ωc and the angular velocity feedback value ωfb to be described below are input to the subtractor 531. The subtractor 531 outputs a deviation (value obtained by subtracting the angular velocity feedback value ωfb from the targeted value of the angular velocity of the first drive source 401) between the angular velocity command ωc and the angular velocity feedback value ωfb to the angular velocity controller 541.

The angular velocity controller 541 performs predetermined calculation processing including integration, using the deviation input from the subtractor 531, a proportional gain that is a predetermined factor, an integration gain, or the like, thereby generating a driving signal (driving current) of the first drive source 401 according to the deviation and supplying the driving signal to the motor 401M via the motor driver 301. In addition, in the present embodiment, the PI (proportion/integration) control is performed as the feedback control. However, the feedback control is not limited to this.

In this way, the feedback control is performed and the driving current of the first drive source 401 is controlled so that the position feedback value Pfb is as equal to the position command Pc as possible and the angular velocity feedback value ωfb is as equal to the angular velocity command We as possible.

Next, the angular velocity feedback value ωfb in the first drive source controller 201 will be described.

In the angular velocity calculator 561, an angular velocity ωm1 of the first drive source 401 is calculated on the basis of the frequency of a pulse signal input from the first angle sensor 411, and the angular velocity ωm1 is output to the adder 601.

Additionally, in the angular velocity calculator 561, an angular velocity ωA1m of the first arm 12 around the rotation axis O1 is calculated on the basis of the frequency of the pulse signal input from the first angle sensor 411, and the angular velocity ωA1m is output to the subtractor 571. In addition, the angular velocity ωA1m is a value obtained by dividing the angular velocity ωm1 by a reduction ratio between the motor 401M of the first drive source 401 and the first arm 12, that is, in the joint 171.

Additionally, the angular velocity of the first arm 12 around the rotation axis O1 is detected by the first inertia sensor 31. A detection signal of the first inertia sensor 31, that is, an angular velocity ωA1 of the first arm 12 around the rotation axis O1 detected by the first inertia sensor 31 is output to the subtractor 571.

The angular velocity ωA1 and the angular velocity ωA1m are input to the subtractor 571, and the subtractor 571 outputs a value ωA1s (=ωA1−ωA1m) obtained by subtracting the angular velocity ωA1m from the angular velocity ωA1 to the converter 581. The value ωA1s is equivalent to a vibration component (vibration angular velocity) of the angular velocity of the first arm 12 around the rotation axis O1. Hereinafter, ωA1s is referred to as a vibration angular velocity. In the present embodiment, feedback control is performed in which the vibration angular velocity ωA1s (in detail, an angular velocity ωm1s in the motor 401M that is a value generated on the basis of the vibration angular velocity ωA1s) is multiplied by a gain Ka to be described below and is returned to the input side of the drive source 401. Specifically, feedback control is performed on the drive source 401 so that the vibration angular velocity ωA1s becomes as close to zero as possible. Accordingly, the vibration in the robot 1 can be suppressed. In addition, the angular velocity of the drive source 401 is controlled in the feedback control.

The converter 581 converts the vibration angular velocity ωA1s into the angular velocity ωm1s in the first drive source 401, and outputs the angular velocity ωm1s to the correction value calculator 591. This conversion can be obtained by multiplying the vibration angular velocity ωA1s by the reduction ratio between the motor 401M of the first drive source 401 and the first arm 12, that is, in the joint 171.

The correction value calculator 591 multiplies the angular velocity ωm1s by a gain (feedback gain) Ka that is a predetermined factor, obtains a correction value (first correction component) Ka·ωm1s, and outputs the correction value Ka·ωm1s to the adder 601.

The angular velocity ωm1 and the correction value Ka·ωm1s are input to the adder 601. The adder 601 outputs an additional value of the angular velocity ωm1 and the correction value Ka·ωm1s to the subtractor 531 as the angular velocity feedback value ωfb. In addition, the subsequent operation is as mentioned above.

As shown in FIG. 7, in addition to a position command Pc of the second drive source 402, detection signals are input from the second angle sensor 412 and the second inertia sensor 32, respectively, to the second drive source controller 202. The second drive source controller 202 drives the second drive source 402 by feedback control using the respective detection signals so that a rotation angle (position feedback value Pfb) of the second drive source 402 calculated from the detection signal of the second angle sensor 412 becomes the position command Pc and an angular velocity feedback value ωfb to be described below becomes an angular velocity command ωc.

That is, the position command Pc is input to the subtractor 512 of the second drive source controller 202, and the position feedback value Pfb to be described below is input from the rotation angle calculator 552. In the rotation angle calculator 552, the number of pulses input from the second angle sensor 412 is counted, and the rotation angle of the second drive source 402 according to the counted value is output to the subtractor 512 as the position feedback value Pfb. The subtractor 512 outputs a deviation (value obtained by subtracting the position feedback value Pfb from a targeted value of the rotation angle of the second drive source 402) between the position command Pc and the position feedback value Pfb to the position controller 522.

The position controller 522 performs predetermined calculation processing using the deviation input from the subtractor 512 and a proportional gain that is a predetermined factor, and calculates the targeted value of the angular velocity of the second drive source 402 according to the deviation. The position controller 522 outputs a signal showing the targeted value (command value) of the angular velocity of the second drive source 402 to the subtractor 532 as the angular velocity command (second angular velocity command) ωc. In addition, in the present embodiment, a proportional control (P control) is performed as the feedback control. However, the feedback control is not limited to this.

The angular velocity command ωc and the angular velocity feedback value ωfb to be described below are input to the subtractor 532. The subtractor 532 outputs a deviation (value obtained by subtracting the angular velocity feedback value ωfb from the targeted value of the angular velocity of the second drive source 402) between the angular velocity command ωc and the angular velocity feedback value ωfb to the angular velocity controller 542.

The angular velocity controller 542 performs predetermined calculation processing including integration, using the deviation input from the subtractor 532, a proportional gain that is a predetermined factor, an integration gain, or the like, thereby generating a driving signal (driving current) of the second drive source 402 according to the deviation and supplying the driving signal to the motor 402M via the motor driver 302. In addition, in the present embodiment, the PI control is performed as the feedback control. However, the feedback control is not limited to this.

In this way, the feedback control is performed and the driving current of the second drive source 402 is controlled so that the position feedback value Pfb is as equal to the position command Pc as possible and the angular velocity feedback value ωfb is as equal to the angular velocity command ωc as possible. In addition, since the rotation axis O2 is orthogonal to the rotation axis O1, the rotation axis is not influenced by the operation or vibration of the first arm 12, and the operation of the second drive source 402 can be controlled independently from the first drive source 401.

Next, the angular velocity feedback value ωfb in the second drive source controller 202 will be described.

In the angular velocity calculator 562, an angular velocity ωm2 of the second drive source 402 is calculated on the basis of the frequency of a pulse signal input from the second angle sensor 412, and the angular velocity ωm2 is output to the adder 602.

Additionally, in the angular velocity calculator 562, an angular velocity ωA2m of the second arm 13 around the rotation axis O2 is calculated on the basis of the frequency of the pulse signal input from the second angle sensor 412, and the angular velocity ωA2m is output to the subtractor 572. In addition, the angular velocity ωA2m is a value obtained by dividing the angular velocity ωm2 by a reduction ratio between the motor 402M of the second drive source 402 and the second arm 13, that is, in the joint 172.

Additionally, the angular velocity of the second arm 13 around the rotation axis O2 is detected by the second inertia sensor 32. A detection signal of the second inertia sensor 32, that is, an angular velocity ωA2 of the second arm 13 around the rotation axis O2 detected by the second inertia sensor 32 is output to the subtractor 572. In addition, since the rotation axis O2 is orthogonal to the rotation axis O1, the angular velocity of the second arm 13 around the rotation axis O2 can be easily and reliably obtained without being influenced by the operation or vibration of the first arm 12.

The angular velocity ωA2 and the angular velocity ωA2m are input to the subtractor 572, and the subtractor 572 outputs a value ωA2s (=ωA2−ωA2m) obtained by subtracting the angular velocity ωA2m from the angular velocity ωA2 to the converter 582. The value ωA2s is equivalent to a vibration component (vibration angular velocity) of the angular velocity of the second arm 13 around the rotation axis O2. Hereinafter, ωA2s is referred to as a vibration angular velocity. In the present embodiment, feedback control is performed in which the vibration angular velocity ωA2s (in detail, an angular velocity ωm2s in the motor 402M that is a value generated on the basis of the vibration angular velocity ωA2s) is multiplied by a gain Ka to be described below and is returned to the input side of the second drive source 402. Specifically, feedback control is performed on the second drive source 402 so that the vibration angular velocity ωA2s becomes as close to zero as possible. Accordingly, the vibration in the robot 1 can be suppressed. In addition, the angular velocity of the second drive source 402 is controlled in the feedback control.

The converter 582 converts the vibration angular velocity ωA2s into the angular velocity ωm2s in the second drive source 402, and outputs the angular velocity ωm2s to the correction value calculator 592. This conversion can be obtained by multiplying the vibration angular velocity ωA2s by the reduction ratio between the motor 402M of the second drive source 402 and the second arm 13, that is, in the joint 172.

The correction value calculator 592 multiplies the angular velocity ωm2s by a gain (feedback gain) Ka that is a predetermined factor, obtains a correction value (second correction component) Ka·ωm2s, and outputs the correction value Ka·ωm2s to the adder 602. In addition, the gain Ka in the second drive source controller 202 and the gain Ka in the first drive source controller 201 may be the same or may be different.

The angular velocity ωm2 and the correction value Ka·ωm2s are input to the adder 602. The adder 602 outputs an additional value of the angular velocity ωm2 and the correction value Ka·ωm2s to the subtractor 532 as the angular velocity feedback value ωfb. In addition, the subsequent operation is as mentioned above.

As shown in FIG. 8, in addition to a position command Pc of the third drive source 403, a detection signal is input from the third angle sensor 413 to the third drive source controller 203. The third drive source controller 203 drives the third drive source 403 by feedback control using the respective detection signals so that a rotation angle (position feedback value Pfb) of the third drive source 403 calculated from the detection signal of the third angle sensor 413 becomes the position command Pc and an angular velocity feedback value ωfb to be described below becomes an angular velocity command ωc.

That is, the position command Pc is input to the subtractor 513 of the third drive source controller 203, and the position feedback value Pfb to be described below is input from the rotation angle calculator 553. In the rotation angle calculator 553, the number of pulses input from the third angle sensor 413 is counted, and the rotation angle of the third drive source 403 according to the counted value is output to the subtractor 513 as the position feedback value Pfb. The subtractor 513 outputs a deviation (value obtained by subtracting the position feedback value Pfb from a targeted value of the rotation angle of the third drive source 403) between the position command Pc and the position feedback value Pfb to the position controller 523.

The position controller 523 performs predetermined calculation processing using the deviation input from the subtractor 512, a proportional gain that is a predetermined factor, and the like and calculates the targeted value of the angular velocity of the third drive source 403 according to the deviation. The position controller 522 outputs a signal showing the targeted value (command value) of the angular velocity of the third drive source 403 to the subtractor 533 as the angular velocity command ωc. In addition, in the present embodiment, a proportional control (P control) is performed as the feedback control. However, the feedback control is not limited to this.

Additionally, in the angular velocity calculator 563, the angular velocity of the third drive source 403 is calculated on the basis of the frequency of a pulse signal input from the third angle sensor 413, and the angular velocity is output to the subtractor 533 as the angular velocity feedback value ωfb.

The angular velocity command ωc and the angular velocity feedback value ωfb are input to the subtractor 533. The subtractor 533 outputs a deviation (value obtained by subtracting the angular velocity feedback value ωfb from the targeted value of the angular velocity of the third drive source 403) between the angular velocity command ωc and the angular velocity feedback value ωfb to the angular velocity controller 543.

The angular velocity controller 543 performs predetermined calculation processing including integration, using the deviation input from the subtractor 533, a proportional gain that is a predetermined factor, an integration gain, or the like, thereby generating a driving signal (driving current) of the third drive source 403 according to the deviation and supplying the driving signal to the motor 403M via the motor driver 303. In addition, in the present embodiment, the PI control is performed as the feedback control. However, the feedback control is not limited to this.

In this way, the feedback control is performed and the driving current of the third drive source 403 is controlled so that the position feedback value Pfb is as equal to the position command Pc as possible and the angular velocity feedback value ωfb is as equal to the angular velocity command ωc as possible.

In addition, since the drive source controllers 204 to 206 are the same as the third drive source controller 203, respectively, the description thereof is omitted.

As described above, according to the robot 1, the vibration in the robot 1 can be easily and reliably suppressed.

First, in the control of the robot 1, a huge calculation is unnecessary, and thereby, the response speed in the control of the robot 1 can be increased, and the configuration of the control device 20 can be simplified.

Additionally, in the control of the robot 1, a calculation in which a singular point is present is unnecessary. Thus, the control of the robot 1 can be reliably performed, and thereby, vibration can be reliably suppressed.

Additionally, since the inertia sensors 31 and 32 are installed at the first arm 12 and the second arm 13, respectively, and the first rotation axis O1 for the rotation of the first arm 12 and the second rotation axis O2 for the rotation of the second arm 13 are made orthogonal to each other, the angular velocities of the respective arms can be detected as simple rotational components in which these velocities are not mixed. Hence, since control is performed by the calculation using these velocities, the vibration in the robot 1 can be more easily, accurately, and reliably suppressed.

In addition, since the first rotation axis O1 for the rotation of the first arm 12 and the second rotation axis O2 for the rotation of the second arm 13 are made orthogonal to each other, the angular velocities of the respective arms can be detected as simple rotational components in which these velocities are not mixed. Since the rotational components with no mixture of these velocities are multiplied by feedback gains, respectively, the respective rotational components can be corrected with high precision.

Second Embodiment

Figure 12:
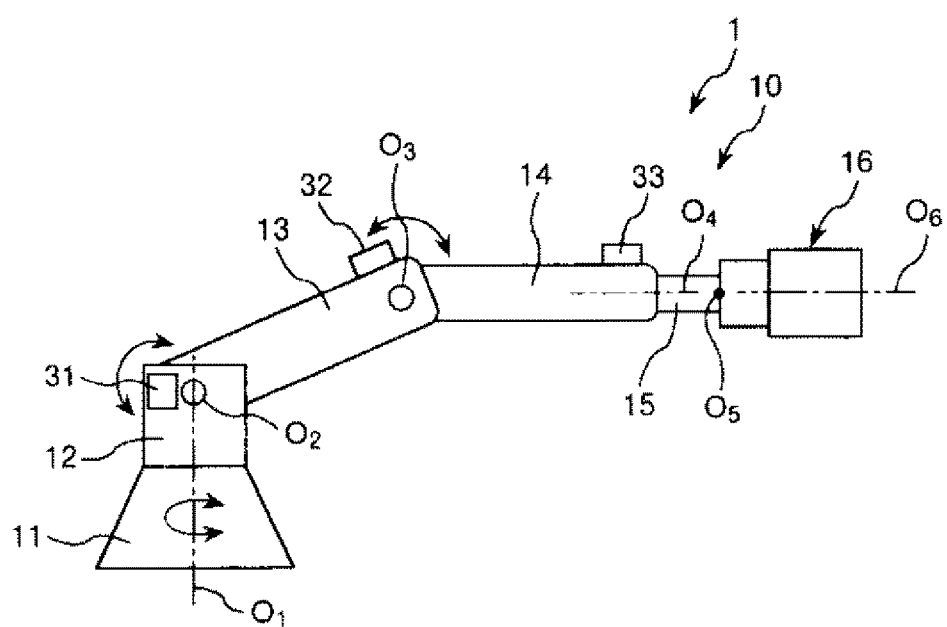
FIG. 12 is a schematic view showing a second embodiment of a robot.
Figure 13:
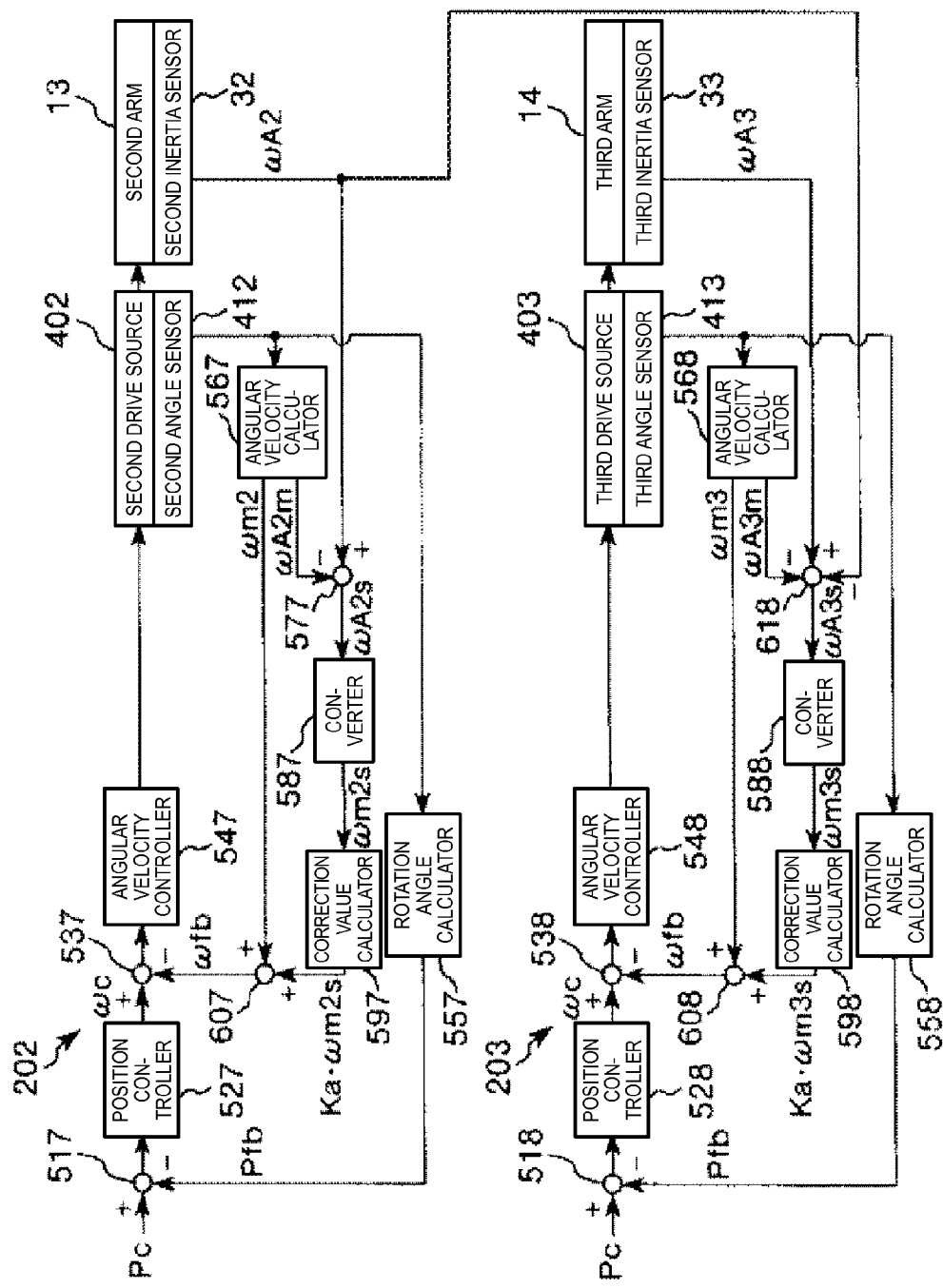
FIG. 13 is a block diagram of portions of the robot shown in FIG. 12.

FIG. 12 is a schematic view showing a second embodiment of a robot. FIG. 13 is a block diagram of portions of the robot shown in FIG. 12.

In addition, in the following, for convenience of description, the upper side in FIG. 12 is referred to as "upper" and "upside" and the lower side is referred to as "lower" and "downside". Additionally, the base side in FIG. 12 is referred to as a "base end", and the opposite side is referred to as a "tip". Additionally, the rotation axes O2 and O3 are shown in an exaggerated manner in FIG. 12, respectively. Additionally, inertia sensors 31, 32, and 33 are shown outside arms 12, 13, 14 in FIG. 12, respectively, in order to clarify the presence of the sensors.

The second embodiment will be described below mainly regarding the differences from the aforementioned first embodiment, and the description of the same matters will be omitted.

As shown in FIG. 12, in the robot 1 of the second embodiment, the third inertia sensor 33 is installed at the third arm 14. The third inertia sensor 33 detects the angular velocity of the third arm 14 around the rotation axis O2. Although the installation position of the third inertia sensor 33 at the third arm 14 is not particularly limited, a tip portion of the third arm 14 is preferable. In the present embodiment, the third inertia sensor 33 is installed at the tip portion inside the third arm 14. Since the vibration in the third arm 14 becomes the maximum at the tip portion of the third arm 14, this can more reliably suppress the vibration in the robot 1. In addition, it should be understood that the third inertia sensor 33 may be installed at a base end portion of the third arm 14.

Additionally, the third inertia sensor 33 is not particularly limited, and in the present embodiment, for example, a gyroscope sensor, an acceleration sensor, or the like can be used.

In the robot 1, in order to suppress the vibration in the first arm 12, the second arm 13, and the third arm 14, the first inertia sensor 31, the second inertia sensor 32, and the third inertia sensor 33 are installed at all the first arm 12, the second arm 13, and the third arm 14 as mentioned above, and the operation of the first drive source 401, the second drive source 402, and the third drive source 403 is controlled on the basis of detection results of the first inertia sensor 31, the second inertia sensor 32, and the third inertia sensor 33. Accordingly, the vibration in the first arm 12, the second arm 13, and the third arm 14 can be reliably suppressed, and thereby, the vibration in the entire robot 1 can be reliably suppressed.

Additionally, in the robot 1, the third drive source controller 203 of the control device 20 is different from that of the first embodiment. The third drive source controller 203 will be described below.

As shown in FIG. 13, the third drive source controller 203 has a subtractor 518, a position controller 528, a subtractor 538, an angular velocity controller 548, a rotation angle calculator 558, an angular velocity calculator 568, an adder-subtractor 618, a converter 588, a correction value calculator 598, and an adder 608. In addition to a position command Pc of the third drive source 403, detection signals are input from the third angle sensor 413, the second inertia sensor 32, and the third inertia sensor 33, respectively, to the third drive source controller 203. The third drive source controller 203 drives the third drive source 403 by feedback control using the respective detection signals so that a rotation angle (position feedback value Pfb) of the third drive source 403 calculated from the detection signal of the third angle sensor 413 becomes the position command Pc and an angular velocity feedback value ωfb to be described below becomes an angular velocity command ωc.

That is, the position command Pc is input to the subtractor 518 of the third drive source controller 203, and the position feedback value Pfb to be described below is input from the rotation angle calculator 558. In the rotation angle calculator 558, the number of pulses input from the third angle sensor 413 is counted, and the rotation angle of the third drive source 403 according to the counted value is output to the subtractor 518 as the position feedback value Pfb. The subtractor 518 outputs a deviation (value obtained by subtracting the position feedback value Pfb from a targeted value of the rotation angle of the third drive source 403) between the position command Pc and the position feedback value Pfb to the position controller 528.

The position controller 528 performs predetermined calculation processing using the deviation input from the subtractor 518, a proportional gain that is a predetermined factor, and the like and calculates the targeted value of the angular velocity of the third drive source 403 according to the deviation. The position controller 528 outputs a signal showing the targeted value (command value) of the angular velocity of the third drive source 403 to the subtractor 538 as the angular velocity command (third angular velocity command) ωc. In addition, in the present embodiment, a proportional control (P control) is performed as the feedback control. However, the feedback control is not limited to this.

The angular velocity command ωc and the angular velocity feedback value ωfb to be described below are input to the subtractor 538. The subtractor 538 outputs a deviation (value obtained by subtracting the angular velocity feedback value ωfb from the targeted value of the angular velocity of the third drive source 403) between the angular velocity command ωc and the angular velocity feedback value ωfb to the angular velocity controller 548.

The angular velocity controller 548 performs predetermined calculation processing including integration, using the deviation input from the subtractor 538, a proportional gain that is a predetermined factor, an integration gain, or the like, thereby generating a driving signal (driving current) of the third drive source 403 according to the deviation and supplying the driving signal to the motor of the third drive source 403 via the motor driver 303. In addition, in the present embodiment, the PI control is performed as the feedback control. However, the feedback control is not limited to this.

In this way, the feedback control is performed and the driving current of the third drive source 403 is controlled so that the position feedback value Pfb is as equal to the position command Pc as possible and the angular velocity feedback value ωfb is as equal to the angular velocity command ωc as possible. In addition, since the rotation axis O3 is orthogonal to the rotation axis O1, the rotation axis is not influenced by the operation or vibration of the first arm 12, and the operation of the third drive source 403 can be controlled independently from the first drive source 401.

Next, the angular velocity feedback value ωfb in the third drive source controller 203 will be described.

In the angular velocity calculator 568, an angular velocity ωm3 of the third drive source 403 is calculated on the basis of the frequency of a pulse signal input from the third angle sensor 413, and the angular velocity ωm3 is output to the adder 608.

Additionally, in the angular velocity calculator 568, an angular velocity ωA3m of the third arm 14 around the rotation axis O3 is calculated on the basis of the frequency of the pulse signal input from the third angle sensor 413, and the angular velocity ωA3m is output to the adder-subtractor 618. In addition, the angular velocity ωA3m is a value obtained by dividing the angular velocity ωm3 by a reduction ratio between the motor 403M of the third drive source 403 and the third arm 14, that is, in the joint 173.

Additionally, the angular velocity of the third arm 14 around the rotation axis O2 is detected by the third inertia sensor 33. A detection signal of the third inertia sensor 33, that is, an angular velocity ωA3 of the third arm 14 around the rotation axis O2 detected by the third inertia sensor 33 is output to the adder-subtractor 618. In addition, since the rotation axes O2 and O3 are orthogonal to the rotation axis O1, respectively, the angular velocity of the third arm 14 around the rotation axis O2 can be easily and reliably obtained without being influenced by the operation or vibration of the first arm 12.

Additionally, the detection signal of the aforementioned second inertia sensor 32, that is, the angular velocity ωA2 of the second arm 13 around the rotation axis O2 detected by the second inertia sensor 32 is output to the adder-subtractor 618.

The angular velocity ωA3, the angular velocity ωA2, and the angular velocity ωA3m are input to the adder-subtractor 618, and the adder-subtractor 618 outputs a value ωA3s (=ωA3−ωA2−ωA3m) obtained by subtracting the angular velocity ωA2 and the angular velocity ωA3m from the angular velocity ωA3 to the converter 588. The value ωA3s is equivalent to a vibration component (vibration angular velocity) of the angular velocity of the third arm 14 around the rotation axis O3. Hereinafter, ωA3s is referred to as a vibration angular velocity. In the present embodiment, feedback control is performed in which the vibration angular velocity ωA3s (in detail, an angular velocity ωm3s in the motor 403M that is a value generated on the basis of the vibration angular velocity ωA3s) is multiplied by a gain Ka to be described below and is returned to the input side of the third drive source 403. Specifically, feedback control is performed on the third drive source 403 so that the vibration angular velocity ωA3s becomes as close to zero as possible. Accordingly, the vibration in the robot 1 can be suppressed. In addition, the angular velocity of the third drive source 403 is controlled in the feedback control.

The converter 588 converts the vibration angular velocity ωA3s into the angular velocity ωm3s in the third drive source 403, and outputs the angular velocity ωm3s to the correction value calculator 598. This conversion can be obtained by multiplying the vibration angular velocity ωA3s by the reduction ratio between the motor 403M of the third drive source 403 and the third arm 14, that is, in the joint 173.

The correction value calculator 598 multiplies the angular velocity ωm3s by a gain (feedback gain) Ka that is a predetermined factor, obtains a correction value (third correction component) Ka·ωm3s, and outputs the correction value Ka·ωm3s to the adder 608. In addition, the gain Ka in the third drive source controller 203, the gain Ka in the first drive source controller 201, and the gain Ka in the second drive source controller 202 may be the same or may be different, respectively.

The angular velocity ωm3 and the correction value Ka·ωm3s are input to the adder 608. The adder 608 outputs an additional value of the angular velocity ωm3 and the correction value Ka·ωm3s to the subtractor 538 as the angular velocity feedback value ωfb. In addition, the subsequent operation is the same as that of the first embodiment.

According to the robot 1, the same effects as the aforementioned first embodiment are obtained.

In this robot 1, since the control of suppressing vibration is also performed on the third arm 14, the vibration in the robot 1 can be more reliably suppressed.

Additionally, since the inertia sensors 31, 32, and 33 are installed at the first arm 12, the second arm 13, and the third arm 14, respectively, and the first rotation axis O1 for the rotation of the first arm 12 and the second rotation axis O2 for the rotation of the second arm 13 are made orthogonal to each other, the second rotation axis O2 for the rotation of the second arm 13 and the third rotation axis O3 for the rotation of the third arm 14 are made parallel to each other, the angular velocities of the respective arms can be detected as simple rotational components in which these velocities are not mixed. Hence, since control is performed by the calculation using these velocities, the vibration in the robot 1 can be more easily, accurately, and reliably suppressed.

Third Embodiment

Figure 14:
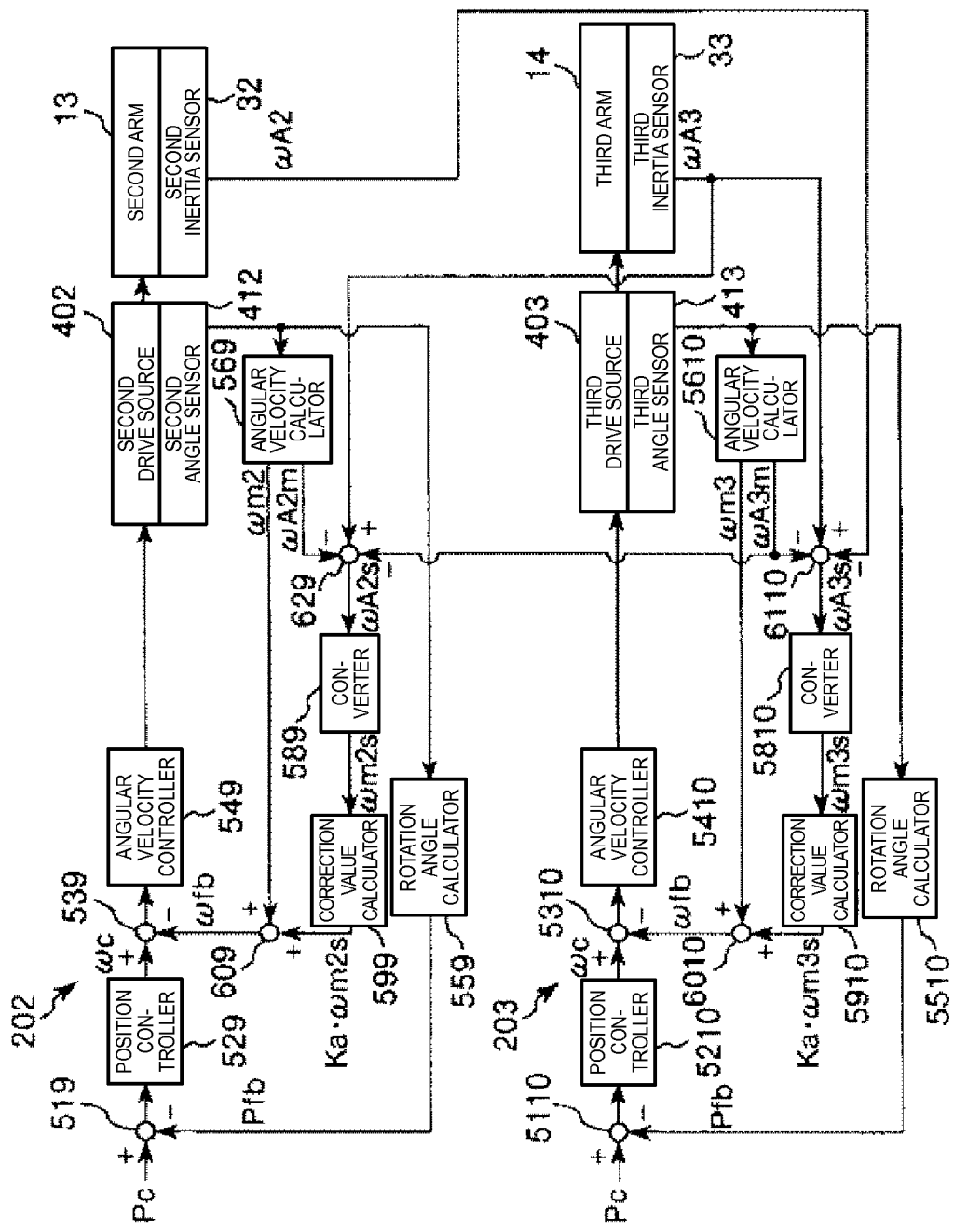
FIG. 14 is a block diagram showing portions of a third embodiment of a robot.

FIG. 14 is a block diagram showing portions of a third embodiment of a robot.

The third embodiment will be described below mainly regarding differences from the aforementioned second embodiment, and the description of the same matters will be omitted.

As shown in FIG. 14, in the robot 1 of the third embodiment, the second drive source controller 202 of the control device 20 is different from that of the second embodiment. The second drive source controller 202 will be described below.

As shown in FIG. 14, the second drive source controller 202 has an adder-subtractor 629 instead of the subtractor 577. In addition to a position command Pc of the second drive source 402, detection signals are input from the second angle sensor 412 and the third inertia sensor 33, respectively, to the second drive source controller 202. Additionally, an angular velocity ωA3m of the third arm 14 around the rotation axis O3 is input from the third drive source controller 203 to the second drive source controller 202. The second drive source controller 202 drives the second drive source 402 by feedback control using the respective detection signals so that a rotation angle (position feedback value Pfb) of the second drive source 402 calculated from the detection signal of the second angle sensor 412 becomes the position command Pc and an angular velocity feedback value ωfb to be described below becomes an angular velocity command ωc.

That is, the position command Pc is input to the subtractor 519 of the second drive source controller 202, and the position feedback value Pfb to be described below is input from the rotation angle calculator 559. In the rotation angle calculator 559, the number of pulses input from the second angle sensor 412 is counted, and the rotation angle of the second drive source 402 according to the counted value is output to the subtractor 519 as the position feedback value Pfb. The subtractor 519 outputs a deviation (value obtained by subtracting the position feedback value Pfb from a targeted value of the rotation angle of the second drive source 402) between the position command Pc and the position feedback value Pfb to the position controller 529.

The position controller 529 performs predetermined calculation processing using the deviation input from the subtractor 519 and a proportional gain that is a predetermined factor, and calculates the targeted value of the angular velocity of the second drive source 402 according to the deviation. The position controller 529 outputs a signal showing the targeted value (command value) of the angular velocity of the second drive source 402 to the subtractor 539 as the angular velocity command (second angular velocity command) ωc. In addition, in the present embodiment, a proportional control (P control) is performed as the feedback control. However, the feedback control is not limited to this.

The angular velocity command ωc and the angular velocity feedback value ωfb to be described below are input to the subtractor 539. The subtractor 539 outputs a deviation (value obtained by subtracting the angular velocity feedback value ωfb from the targeted value of the angular velocity of the second drive source 402) between the angular velocity command ωc and the angular velocity feedback value ωfb to the angular velocity controller 549.

The angular velocity controller 549 performs predetermined calculation processing including integration, using the deviation input from the subtractor 539, a proportional gain that is a predetermined factor, an integration gain, or the like, thereby generating a driving signal (driving current) of the second drive source 402 according to the deviation and supplying the driving signal to the motor 402M via the motor driver 302. In addition, in the present embodiment, the PI control is performed as the feedback control. However, the feedback control is not limited to this.

In this way, the feedback control is performed and the driving current of the second drive source 402 is controlled so that the position feedback value Pfb is as equal to the position command Pc as possible and the angular velocity feedback value ωfb is as equal to the angular velocity command ωc as possible.

Next, the angular velocity feedback value ωfb in the second drive source controller 202 will be described.

In the angular velocity calculator 569, an angular velocity ωm2 of the second drive source 402 is calculated on the basis of the frequency of a pulse signal input from the second angle sensor 412, and the angular velocity ωm2 is output to the adder 609.

Additionally, in the angular velocity calculator 569, the angular velocity ωA2m of the second arm 13 around the rotation axis O2 is calculated on the basis of the frequency of the pulse signal input from the second angle sensor 412, and the angular velocity ωA2m is output to the adder-subtractor 629. In addition, the angular velocity ωA2m is a value obtained by dividing the angular velocity ωm2 by a reduction ratio between the motor 402M of the second drive source 402 and the second arm 13, that is, in the joint 172.

Additionally, the angular velocity ωA3m of the third arm 14 around the rotation axis O3 is output from the angular velocity calculator 5610 of the aforementioned third drive source controller 203 to the adder-subtractor 629.

Additionally, the detection signal of the aforementioned third inertia sensor 33, that is, the angular velocity ωA3 of the third arm 14 around the rotation axis O2 detected by the third inertia sensor 33 is output to the adder-subtractor 629 and an adder-subtractor 6110.

The angular velocity ωA3, the angular velocity ωA2m, and the angular velocity ωA3m are input to the adder-subtractor 629, and the adder-subtractor 629 outputs a value ωA2s (=ωA3−ωA2m−ωA3m) obtained by subtracting the angular velocity ωA2m and the angular velocity ωA3m from the angular velocity ωA3 to the converter 589. The value ωA2s is equivalent to a vibration component (vibration angular velocity) of the total angular velocity of the second arm 13 and the third arm 14 around the rotation axis O2. Hereinafter, ωA2s is referred to as a vibration angular velocity. In the present embodiment, feedback control is performed in which the vibration angular velocity ωA2s (in detail, an angular velocity ωm2s in the motor 402M that is a value generated on the basis of the vibration angular velocity ωA2s) is multiplied by a gain Ka to be described below and is returned to the input side of the second drive source 402. Specifically, feedback control is performed on the second drive source 402 so that the vibration angular velocity ωA2s becomes as close to zero as possible. Accordingly, the vibration in the robot 1 can be suppressed. In addition, the angular velocity of the second drive source 402 is controlled in the feedback control.

The converter 589 converts the vibration angular velocity ωA2s into the angular velocity ωm2s in the second drive source 402, and outputs the angular velocity ωm2s to the correction value calculator 599. This conversion can be obtained by multiplying the vibration angular velocity ωA2s by the reduction ratio between the motor 402M of the second drive source 402 and the second arm 13, that is, in the joint 172.

The correction value calculator 599 multiplies the angular velocity ωm2s by a gain (feedback gain) Ka that is a predetermined factor, obtains a correction value (second correction component) Ka·ωm2s, and outputs the correction value Ka·ωm2s to the adder 609. In addition, the gain Ka in the second drive source controller 202, the gain Ka in the first drive source controller 201, and the gain Ka in the third drive source controller 203 may be the same or may be different, respectively.

The angular velocity ωm2 and the correction value Ka·ωm2s are input to the adder 609. The adder 609 outputs an additional value of the angular velocity ωm2 and the correction value Ka·ωm2s to the subtractor 539 as the angular velocity feedback value ωfb. In addition, the subsequent operation is the same as the second embodiment.

According to the robot 1, the same effects as the aforementioned second embodiment are obtained.

In the robot 1, since the control of suppressing vibration is performed on the second drive source 402 that drives the second arm 13, using the detection result of the third inertia sensor 33 installed at the third arm 14 on the tip side where a larger vibration than the second arm 13 is generated, the effect of suppressing the vibration in the robot 1 can be enhanced.

In detail, since the second drive source controller 202 performs the control of suppressing vibration on the second drive source 402 that controls the operation of the second drive source 402, that is, rotates the second arm 13 by the angular velocities ωA3, ωA2m, and ωA3m, using the detection result of the third inertia sensor 33 installed at the third arm 13 where a larger vibration than the second arm 13 is generated, the effect of suppressing the vibration can be enhanced.

Fourth Embodiment

Figure 15:
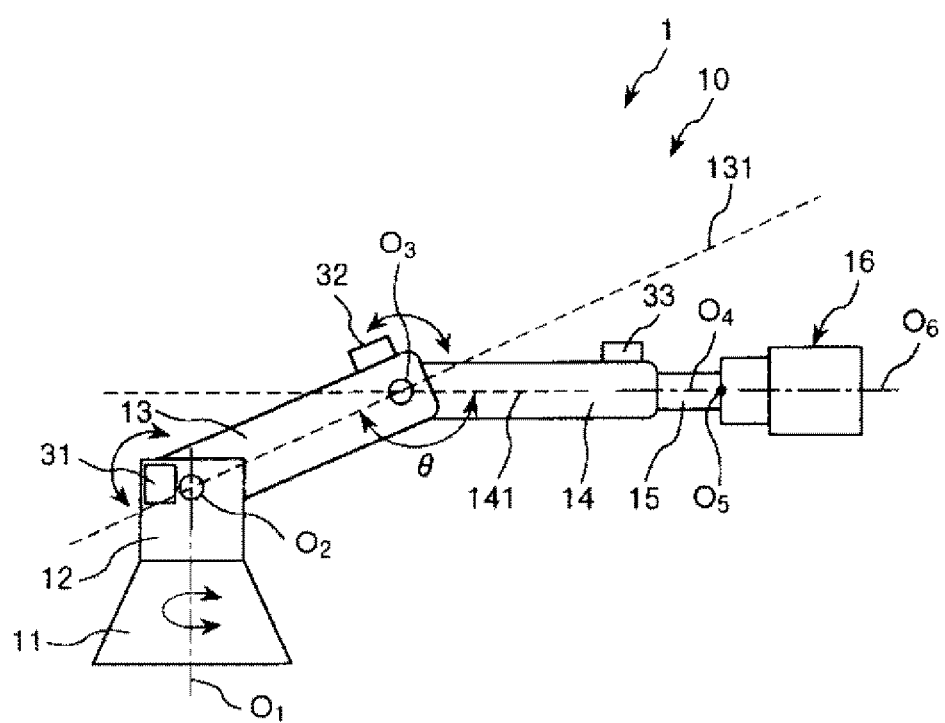
FIG. 15 is a schematic view showing a fourth embodiment of a robot.
Figure 16:
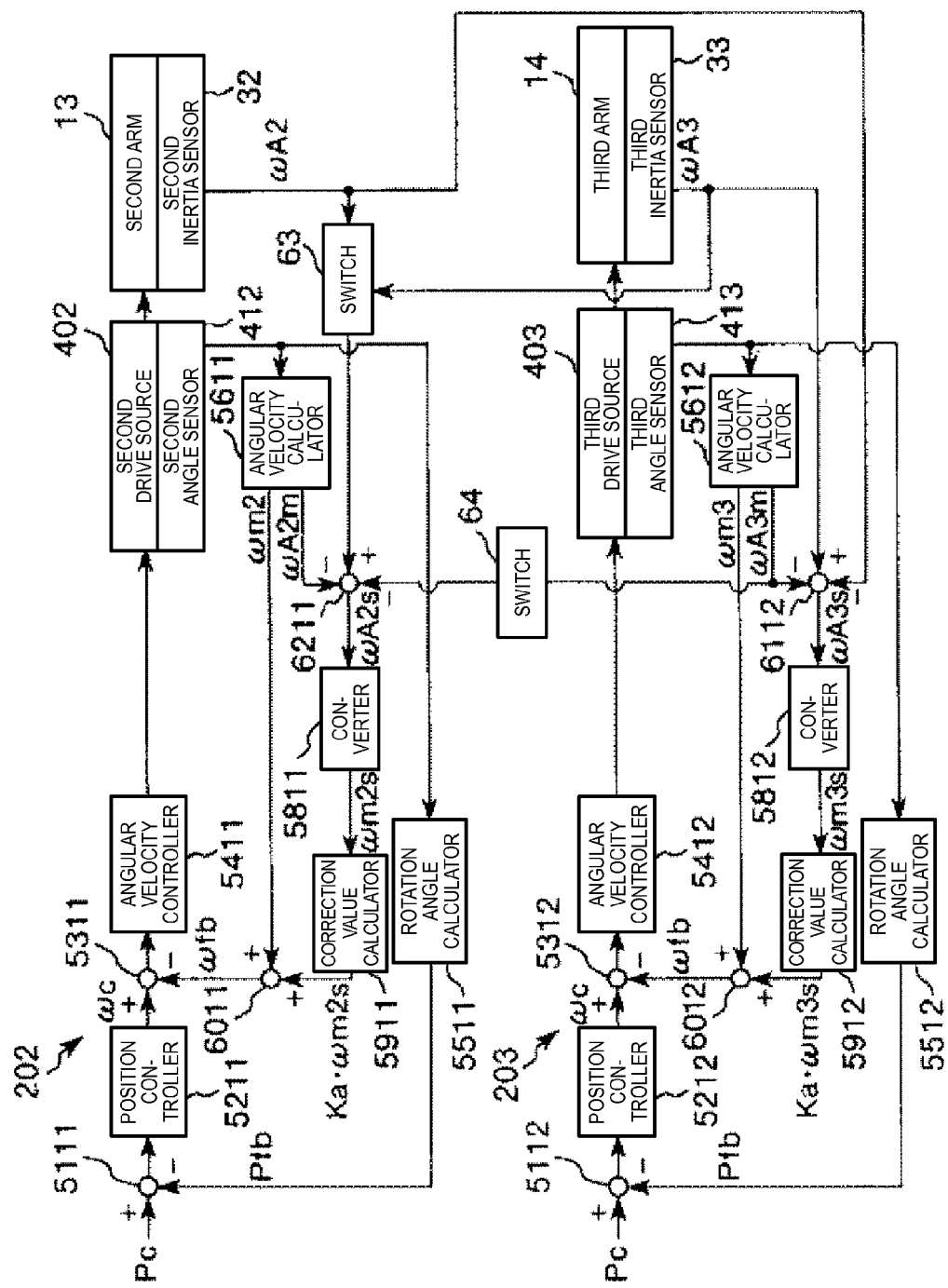
FIG. 16 is a block diagram of portions of the robot shown in FIG. 15.

FIG. 15 is a schematic view showing a fourth embodiment of a robot. FIG. 16 is a block diagram of portions of the robot shown in FIG. 15.

In addition, in the following, for convenience of description, the upper side in FIG. 15 is referred to as "upper" and "upside" and the lower side is referred to as "lower" and "downside". Additionally, the base side in FIG. 15 is referred to as a "base end", and the opposite side is referred to as a "tip". Additionally, the rotation axes O2 and O3 are shown in an exaggerated manner in FIG. 15, respectively. Additionally, inertia sensors 31, 32, and 33 are shown outside arms 12, 13, 14 in FIG. 15, respectively, in order to clarify the presence of the sensors.

The fourth embodiment will be described below mainly regarding differences from the aforementioned second and third embodiments, and the description of the same matters will be omitted.

The robot 1 of the fourth embodiment has an angle detection unit that detects an angle θ (hereinafter simply referred to as an "angle θ") formed between an axis (central axis) 131 of the second arm 13 and an axis 141 of the third arm 14 (to refer to FIG. 15). In the present embodiment, the angle detection unit is constituted by the third angle sensor 413 and the control device 20. That is, a rotation angle calculator 5512 of the third drive source controller 203 of the control device 20 counts the number of pulses input from the third angle sensor 413, obtains the rotation angle of the third drive source 403 according to the counted value, and thereby, obtains the angle θ.

Additionally, as shown in FIG. 16, in the robot 1 of the fourth embodiment, the second drive source controller 202 of the control device 20 is different from that of the second embodiment and the third embodiment. The second drive source controller 202 will be described below.

As shown in FIG. 16, the second drive source controller 202 has switches 63 and 64. The switch 63 selects any one of an angular velocity ωA2 and an angular velocity ωA3, and outputs the selected angular velocity to an adder-subtractor 6211. Additionally, the switch 64 switches between a case where an angular velocity ωA3m is output to the adder-subtractor 6211 and a case where the angular velocity ωA3m is not output to the adder-subtractor 6211.

In the robot 1, the second drive source controller 202 detects the angle θ using the third angle sensor 413 as mentioned above, and selects, according to the detected angle θ, a case where the switches 63 and 64 are switched so that the angular velocity ωA3, an angular velocity ωA2m, and the angular velocity ωA3m are input to the adder-subtractor 6211 and a case where the switches 63 and 64 are switched so that the angular velocity ωA2 and the angular velocity ωA2m are input.

That is, when the angle θ is equal to or larger than a first threshold and equal to or smaller than a second threshold that is larger than the first threshold, the third arm 14 is in a state (hereinafter simply referred to as an "extended state" or an "extended posture") where the third arm 14 is extended or slightly curved with respect to the second arm 13. In this case, the second drive source controller 202 switches the switches 63 and 64 so that the angular velocity ωA3, the angular velocity ωA2m, and the angular velocity ωA3m are input to the adder-subtractor 6211. In this case, the control of the second drive source 402 of the second drive source controller 202 is the same as that of the third embodiment.

Additionally, when the angle θ is smaller than the first threshold and larger than the second threshold, the third arm 14 is in a state (hereinafter simply referred to as a "folded state" or a "folded posture") where the third arm 14 is largely curved with respect to the fourth arm 13. In this case, the second drive source controller 202 switches the switches 63 and 64 so that the angular velocity ωA2 and the angular velocity ωA2m are input to the adder-subtractor 6211. In this case, the control of the second drive source 402 of the second drive source controller 202 is the same as that of the second embodiment.

Accordingly, the compatibility between enhancing the effect of suppressing vibration and the stability of control can be achieved.

That is, when the third arm 14 is in the extended posture, compared to the case of the folded posture, the control of the robot 1 is stable, but the inertia moment of the robot 1 is large and the vibration in the robot is large. Thus, the effect of suppressing vibration can be enhanced by controlling the second drive source 402 similar to the third embodiment, using a detection result of the third inertia sensor 33 installed at the third arm 14 on the tip side of the second arm 13 where a larger vibration than the second arm 13 is generated.

On the other hand, when the third arm 14 is in the folded posture, compared to the case of the extended posture, the inertia moment of the robot 1 is small and the vibration in the robot is small but control tends to become unstable and the robot 1 vibrates easily. Thus, the vibration in the robot 1 can be prevented and control can be stabilized by controlling the second drive source 402 similar to the second embodiment, using a detection result of the second inertia sensor 32 installed at the second arm. 13 on the base end side of the third arm 14 where a smaller vibration than the third arm 14 is generated.

Here, although the first threshold is not particularly limited and is appropriately set according to terms and conditions, the first threshold is preferably set within a range of 45° to 135° and is more preferably set within a range of 70° to 110°. As one example, the first threshold is set to 90°, for example. Additionally, although the second threshold is not particularly limited and is appropriately set according to terms and conditions, the second threshold is preferably set within a range of 225° to 315° and is more preferably set within a range of 250° to 290°. As one example, the second threshold is set to 270°, for example. Accordingly, the compatibility between enhancing the effect of suppressing vibration and the stability of control can be more reliably achieved.

Hereinafter, an angular velocity feedback value ωfb in the second drive source controller 202 will be specifically described.

In an angular velocity calculator 5611, an angular velocity ωm2 of the second drive source 402 is calculated on the basis of the frequency of a pulse signal input from the second angle sensor 412, and the angular velocity ωm2 is output to an adder 6011.

Additionally, in the angular velocity calculator 5611, the angular velocity ωA2m of the second arm 13 around the rotation axis O2 is calculated on the basis of the frequency of the pulse signal input from the second angle sensor 412, and the angular velocity ωA2m is output to the adder-subtractor 6211. In addition, the angular velocity ωA2m is a value obtained by dividing the angular velocity ωm2 by a reduction ratio between the motor 402M of the second drive source 402 and the second arm 13, that is, in the joint 172.

When the angle θ is equal to or larger than the first threshold and is equal to or smaller than the second threshold, the angular velocity ωA3m of the third arm 14 around the rotation axis O3 is input from the angular velocity calculator 5612 of the aforementioned third drive source controller 203 to the adder-subtractor 6211. Additionally, the detection signal of the aforementioned third inertia sensor 33, that is, the angular velocity ωA3 of the third arm 14 around the rotation axis O2 detected by the third inertia sensor 33 is input to the adder-subtractor 6211.

The adder-subtractor 6211 outputs a value, which is obtained by subtracting the angular velocity ωA2m and the angular velocity ωA3m from the angular velocity ωA3, to a converter 5811. The value ωA2s is equivalent to a vibration component (vibration angular velocity) of the total angular velocity of the second arm 13 and the third arm 14 around the rotation axis O2. Hereinafter, ωA2s is referred to as a vibration angular velocity. In the present embodiment, feedback control is performed in which the vibration angular velocity ωA2s (in detail, an angular velocity ωm2s in the motor 402M that is a value generated on the basis of the vibration angular velocity ωA2s) is multiplied by a gain Ka to be described below and is returned to the input side of the second drive source 402. Specifically, feedback control is performed on the second drive source 402 so that the vibration angular velocity ωA2s becomes as close to zero as possible. Accordingly, the vibration in the robot 1 can be suppressed. In addition, the angular velocity of the second drive source 402 is controlled in the feedback control.

On the other hand, when the angle θ is smaller than the first threshold or larger than the second threshold, the angular velocity ωA3m and the angular velocity ωA2 are not input to the adder-subtractor 6211, and the detection signal of the aforementioned second inertia sensor 32, that is, the angular velocity ωA2 of the second arm 13 around the rotation axis O2 detected by the third inertia sensor 33 is input to the adder-subtractor 6211.

The adder-subtractor 6211 outputs a value ωA2s, which is obtained by subtracting the angular velocity ωA2m from the angular velocity ωA2, to the converter 5811. The value ωA2s is equivalent to a vibration component (vibration angular velocity) of the angular velocity of the second arm 13 around the rotation axis O2. Hereinafter, ωA2s is referred to as a vibration angular velocity. In the present embodiment, feedback control is performed in which the vibration angular velocity ωA2s (in detail, an angular velocity ωm2s in the motor 402M that is a value generated on the basis of the vibration angular velocity ωA2s) is multiplied by a gain Ka to be described below and is returned to the input side of the second drive source 402. Specifically, feedback control is performed on the second drive source 402 so that the vibration angular velocity ωA2s becomes as close to zero as possible. Accordingly, the vibration in the robot 1 can be suppressed. In addition, the angular velocity of the second drive source 402 is controlled in the feedback control.

The converter 5811 converts the vibration angular velocity ωA2s into the angular velocity ωm2s in the second drive source 402, and outputs the angular velocity ωm2s to the correction value calculator 5911. This conversion can be obtained by multiplying the vibration angular velocity ωA2s by the reduction ratio between the motor 402M of the second drive source 402 and the second arm 13, that is, in the joint 172.

The correction value calculator 5911 multiplies the angular velocity ωm2s by a gain (feedback gain) Ka that is a predetermined factor, obtains a correction value (second correction component) Ka·ωm2s, and outputs the correction value Ka·ωm2s to the adder 6011. In addition, the gain Ka in the second drive source controller 202, the gain Ka in the first drive source controller 201, and the gain Ka in the third drive source controller 203 may be the same or may be different, respectively.

The angular velocity ωm2 and the correction value Ka·ωm2s are input to the adder 6011. The adder 6011 outputs an additional value of the angular velocity ωm2 and the correction value Ka·ωm2s to the subtractor 5311 as the angular velocity feedback value ωfb. In addition, the subsequent operation is the same as the second and third embodiments.

According to the robot 1, the same effects as the aforementioned second and third embodiments are obtained.

In the robot 1, suitable control can be performed according to the angle θ formed between the axis 131 of the second arm 13 and the axis 141 of the third arm 14.

In addition, in the present embodiment, the configuration of the third drive source controller 203 is the same as that of the third drive source controller 203 of the second and third embodiments. However, the invention is not limited to this, and for example, the third drive source controller of the present embodiment is the same as that of the third drive source controller 203 of the first embodiment.

Although a robot has been described on the basis of the illustrated embodiments, the invention is not limited to this, and the configurations of the respective portions can be replaced with arbitrary configurations having the same functions. Additionally, other arbitrary structures may be added to the invention.

Additionally, the invention may be provided from the combinations of two or more arbitrary configurations (features) among the respective embodiments.

In addition, the motors of the drive sources include, for example, stepping motors or the like in addition to the servo motors, respectively.

Additionally, in the above embodiments, as the angle sensors, other various sensors, such as encoders, resolvers, or potentiometers, which detect the rotation angle of rotor of the motors, may be used and various sensors, such as tachogenerators, which detect the rotating speed of the rotors of the motors, may be used. In addition, when the stepping motors are used as the motor, the rotation angle or rotating speed of the rotors of the motors may be detected, for example, by measuring the number of driving pulses input to the stepping motors.

Additionally, in the above embodiments, the gyroscope sensors can be used as the inertia sensors. However, the invention is not limited to these. For example, other various angular velocity sensors that detect the angular velocity of the arms may be used, and various acceleration sensors that detect the acceleration of the arms may be used. In addition, when the acceleration sensors are used, angular velocity is calculated using the detection values of the acceleration sensors.

Additionally, the types of the angle sensors and the respective inertia sensors are not particularly limited, and include, for example, an optical type, a magnetic type, an electromagnetic type, an electric type, or the like.

Additionally, in the above embodiments, the number of rotation axes of the robot is six. However, the invention is not limited to this, and the number of rotation axes of the robot may be two, three, four, five, or seven or more.

That is, in the above embodiments, the number of arms of the robot is six because the wrist has two arms. However, the invention is not limited to this, and the number of arms of the robot may be two, three, four, five, or seven or more.

Figure 17:
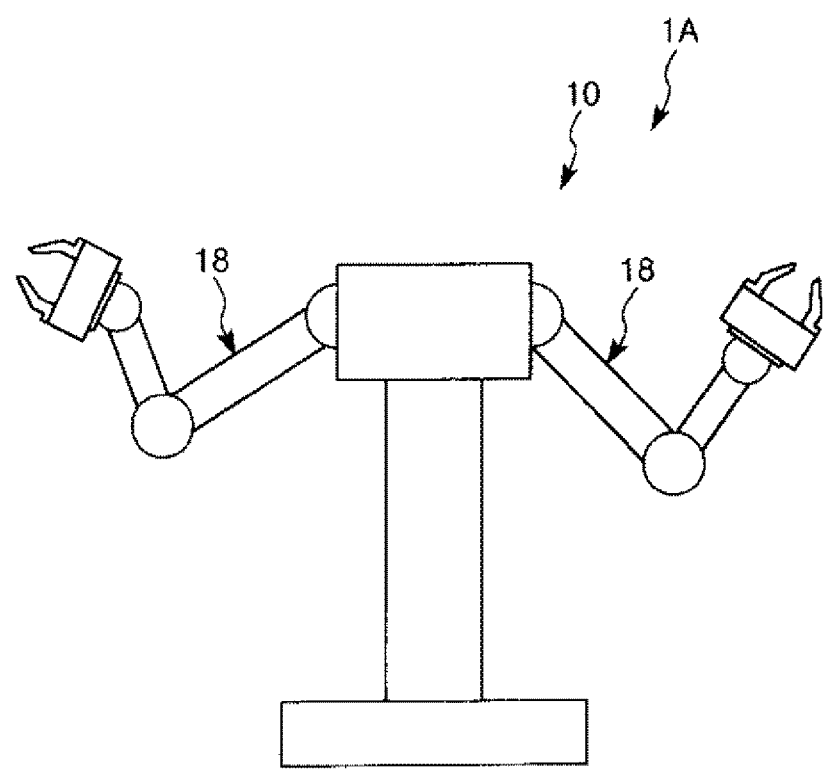
FIG. 17 is a front view showing another configuration example of a robot.

Additionally, in the above embodiments, the robot is a single arm robot that has one arm coupling body obtained by rotatably coupling a plurality of arms. However, the invention is not limited to this. For example, as shown in FIG. 17, robots having a plurality of the arm coupling bodies, such as a double-arm robot 1A having the two arm coupling bodies 18 each obtained by rotatably coupling a plurality of arms, may be used.

The entire disclosure of Japanese Patent Application No. 2012-191449 filed Aug. 31, 2012 is expressly incorporated by reference herein.

What is claimed is:

1. A robot comprising:
a base;
a first arm that is coupled to the base and rotates with a first rotation axis as an axial center;
a second arm that is coupled to the first arm and rotates with a second rotation axis in a direction orthogonal to the first rotation axis as an axial center;
a first drive source that rotates the first arm through a first angular velocity command;
a first inertia sensor that is installed at the first arm and detects the angular velocity or acceleration of the first arm around the first rotation axis;
a first angle sensor that detects the rotation angle of the first drive source;
a second drive source that rotates the second arm through a second angular velocity command;
a second inertia sensor that is installed at the second arm and detects the angular velocity or acceleration of the second arm around the second rotation axis;
a second angle sensor that detects the rotation angle of the second drive source;
a first drive source control unit that feeds back a first correction component, which is derived from an angular velocity $\omega A1$ of the first arm around the first rotation axis obtained from the first inertia sensor and an angular velocity $\omega A1m$ of the first arm around the first rotation axis obtained from the first angle sensor, and controls the first drive source; and
a second drive source control unit that feeds back a second correction component, which is derived from an angular velocity $\omega A2$ of the second arm around the second rotation axis obtained from the second inertia sensor, and an angular velocity $\omega A2m$ of the second arm around the second rotation axis obtained from the second angle sensor, and controls the second drive source.

2. The robot according to claim 1, wherein:
the first drive source control unit feeds back the first angular velocity command by the first correction component obtained by multiplying a value, which is obtained by subtracting the angular velocity $\omega A1m$ from the angular velocity $\omega A1$, by a feedback gain; and
the second drive source control unit feeds back the second angular velocity command by the second correction component obtained by multiplying a value, which is obtained by subtracting the angular velocity $\omega A2m$ from the angular velocity $\omega A2$, by a feedback gain.

3. The robot according to claim 1, further comprising:
a third arm that rotates with a third rotation axis in a direction parallel to the second rotation axis as an axial center;
a third drive source that rotates the third arm through a third angular velocity command;
a third inertia sensor that is installed at the third arm and detects the angular velocity or acceleration of the third arm around the second rotation axis;
a third angle sensor that detects the rotation angle of the third drive source; and
a third drive source control unit that feeds back a third correction component, which is derived from the angular velocity $\omega A2$, an angular velocity $\omega A3$ of the third arm around the second rotation axis obtained from the third inertia sensor, and an angular velocity $\omega A3m$ of the third arm around the third rotation axis obtained from the third angle sensor, and controls the third drive source.

4. The robot according to claim 3, wherein:
the first drive source control unit feeds back the first angular velocity command by the first correction component obtained by multiplying a value, which is obtained by subtracting the angular velocity $\omega A1m$ from the angular velocity $\omega A1$, by a feedback gain;
the second drive source control unit feeds back the second angular velocity command by the second correction component obtained by multiplying a value, which is obtained by subtracting the angular velocity $\omega A2m$ from the angular velocity $\omega A2$, by a feedback gain; and
the third drive source control unit feeds back the third angular velocity command by the third correction component obtained by multiplying a value, which is obtained by subtracting the angular velocity $\omega A2$ and the angular velocity $\omega A3m$ from the angular velocity $\omega A3$, by a feedback gain.

5. A robot comprising:
a base;
a first arm that is coupled to the base and rotates with a first rotation axis as an axial center;
a second arm that is coupled to the first arm and rotates with a second rotation axis in a direction orthogonal to the first rotation axis as an axial center;
a third arm that rotates with a third rotation axis in a direction parallel to the second rotation axis as an axial center;
a first drive source that rotates the first arm through a first angular velocity command;
a first inertia sensor that is installed at the first arm and detects the angular velocity or acceleration of the first arm around the first rotation axis;
a first angle sensor that detects the rotation angle of the first drive source;
a second drive source that rotates the second arm through a second angular velocity command;
a second inertia sensor that is installed at the second arm and detects the angular velocity or acceleration of the second arm around the second rotation axis;

a second angle sensor that detects the rotation angle of the second drive source;
a third drive source that rotates the third arm through a third angular velocity command;
a third inertia sensor that is installed at the third arm and detects the angular velocity or acceleration of the third arm around the second rotation axis;
a third angle sensor that detects the rotation angle of the third drive source;
a first drive source control unit that feeds back a first correction component, which is derived from an angular velocity $\omega A1$ of the first arm around the first rotation axis obtained from the first inertia sensor and an angular velocity $\omega A1m$ of the first arm around the first rotation axis obtained from the first angle sensor, and controls the first drive source;
a second drive source control unit that feeds back a second correction component, which is derived from an angular velocity $\omega A3$ of the third arm around the second rotation axis obtained from the third inertia sensor, an angular velocity $\omega A2m$ of the second arm around the second rotation axis obtained from the second angle sensor, and an angular velocity $\omega A3m$ of the third arm around the third rotation axis obtained from the third angle sensor, and controls the second drive source; and
a third drive source control unit that feeds back a third correction component, which is derived from an angular velocity $\omega A2$ of the second arm around the second rotation axis obtained from the second inertia sensor, the angular velocity $\omega A3$, and the angular velocity $\omega A3m$, and controls the third drive source.

6. The robot according to claim 5, wherein:
the first drive source control unit feeds back the first angular velocity command by the first correction component obtained by multiplying a value, which is obtained by subtracting the angular velocity $\omega A1m$ from the angular velocity $\omega A1$, by a feedback gain;
the second drive source control unit feeds back the second angular velocity command by the second correction component obtained by multiplying a value, which is obtained by subtracting the angular velocity $\omega A2m$ and the angular velocity $\omega A3m$ from the angular velocity $\omega A3$, by a feedback gain; and
the third drive source control unit feeds back the third angular velocity command by the third correction component obtained by multiplying a value, which is obtained by subtracting the angular velocity $\omega A2$ and the angular velocity $\omega A3m$ from the angular velocity $\omega A3$, by a feedback gain.

7. A robot comprising:
a base;
a first arm that is coupled to the base and rotates with a first rotation axis as an axial center;
a second arm that is coupled to the first arm and rotates with a second rotation axis in a direction orthogonal to the first rotation axis as an axial center;
a third arm that rotates with a third rotation axis in a direction parallel to the second rotation axis as an axial center;
a first drive source that rotates the first arm through a first angular velocity command;
a first inertia sensor that is installed at the first arm and detects the angular velocity or acceleration of the first arm around the first rotation axis;
a first angle sensor that detects the rotation angle of the first drive source;
a second drive source that rotates the second arm through a second angular velocity command;
a second inertia sensor that is installed at the second arm and detects the angular velocity or acceleration of the second arm around the second rotation axis;
a second angle sensor that detects the rotation angle of the second drive source;
a third drive source that rotates the third arm through a third angular velocity command;
a third inertia sensor that is installed at the third arm and detects the angular velocity or acceleration of the third arm around the second rotation axis;
a third angle sensor that detects the rotation angle of the third drive source;
an angle detection unit that detects the arm angle formed between a longitudinal axis of the second arm and a longitudinal axis of the third arm;
a first drive source control unit that feeds back a first correction component, which is derived from an angular velocity $\omega A1$ of the first arm around the first rotation axis of obtained from the first inertia sensor and an angular velocity $\omega A1m$ of the first arm around the first rotation axis obtained from the first angle sensor, and controls the first drive source;
a second drive source control unit that feeds back either a value which is derived from an angular velocity $\omega A3$ of the third arm around the second rotation axis obtained from the third inertia sensor, an angular velocity $\omega A2m$ of the second arm around the second rotation axis obtained from the second angle sensor, and an angular velocity $\omega A3m$ of the third arm around the third rotation axis obtained from the third angle sensor, or a value which is derived from an angular velocity $\omega A2$ of the second arm around the second rotation axis obtained from the second inertia sensor, and the angular velocity $\omega A2m$, as a second correction component according to the arm angle, and controls the second drive source; and
a third drive source control unit that feeds back a third correction component, which is derived from the angular velocity $\omega A2$, the angular velocity $\omega A3$, and the angular velocity $\omega A3m$, and controls the third drive source.

8. The robot according to claim 7, wherein:
the first drive source control unit feeds back the first angular velocity command by the first correction component obtained by multiplying a value, which is obtained by subtracting the angular velocity $\omega A1m$ from the angular velocity $\omega A1$, by a feedback gain;
the second drive source control unit feeds back the second angular velocity command, using either a value obtained by multiplying a value, which is obtained by subtracting the angular velocity $\omega A2m$ and the angular velocity $\omega A3m$ from the angular velocity $\omega A3$, by a feedback gain, or a value obtained by multiplying a value, which is obtained by subtracting the angular velocity $\omega A2m$ from the angular velocity $\omega A2$, by a feedback gain, as the second correction component; and
the third drive source control unit feeds back the third angular velocity command by the third correction component obtained by multiplying a value, which is obtained by subtracting the angular velocity $\omega A2$ and the angular velocity $\omega A3m$ from the angular velocity $\omega A3$, by a feedback gain.

9. The robot according to claim 7, wherein:
the second drive source control unit feeds back the second angular velocity command by the second correction component obtained by multiplying a value, which is obtained by subtracting the angular velocity ωA2m and the angular velocity ωA3m from the angular velocity ωA3, by a feedback gain when the arm angle is equal to or larger than a first threshold and is equal to or smaller than a second threshold that is larger than the first threshold and that feeds back the second angular velocity command by the second correction component obtained by multiplying a value, which is obtained by subtracting the angular velocity ωA2m from the angular velocity ωA2, by a feedback gain when the arm angle is smaller than the first threshold or larger than the second threshold.

10. The robot according to claim 9,
wherein the first threshold is set within a range of 45° to 135°, and the second threshold is set within a range of 225° to 315°.

11. The robot according to claim 1,
wherein the first inertia sensor is installed at a tip portion of the first arm, and
the second inertia sensor is installed at a tip portion of the second arm.

12. The robot according to claim 3,
wherein the first inertia sensor is installed at a tip portion of the first arm,
the second inertia sensor is installed at a tip portion of the second arm, and
the third inertia sensor is installed at a tip portion of the third arm.

13. The robot according to claim 1,
wherein the first rotation axis coincides with a normal line of an installation surface of the base.

14. A robot comprising:
a base;
a first arm that is coupled to the base and rotates with a first rotation axis as an axial center;
a second arm that rotates with a second rotation axis orthogonal to the first rotation axis as an axial center;
a first inertia sensor that detects the angular velocity or acceleration of the first arm;
a first angle sensor that detects the rotation angle of a first drive source of the first arm;
a second inertia sensor that detects the angular velocity or acceleration of the second arm;
a second angle sensor that detects the rotation angle of a second drive source of the second arm;
a first control unit of the first drive source of the first arm that feeds back an angular velocity derived from a detection result of the first angle sensor and an angular velocity detected from the first inertia sensor; and
a second control unit of the second drive source of the second arm that feeds back an angular velocity derived from a detection result of the second angle sensor and an angular velocity detected from the second inertia sensor.

* * * * *